United States Patent
Zagaynov et al.

(10) Patent No.: US 10,387,744 B2
(45) Date of Patent: Aug. 20, 2019

(54) METHOD AND SYSTEM FOR IDENTIFYING EXTENDED CONTOURS WITHIN DIGITAL IMAGES

(71) Applicant: ABBYY Development LLC, Moscow (RU)

(72) Inventors: Ivan Germanovich Zagaynov, Moscow oblast (RU); Vasily Vasilyevich Loginov, Moscow (RU); Stepan Yurievich Lobastov, Kirovskaya oblast (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 15/195,726

(22) Filed: Jun. 28, 2016

(65) Prior Publication Data
US 2017/0372166 A1 Dec. 28, 2017

(30) Foreign Application Priority Data

Jun. 22, 2016 (RU) ................. 2016124833
Jun. 24, 2016 (RU) ................. 2016125288

(51) Int. Cl.
*G06K 9/46* (2006.01)
*G06K 9/48* (2006.01)
(Continued)

(52) U.S. Cl.
CPC ....... *G06K 9/4604* (2013.01); *G06K 9/00442* (2013.01); *G06K 9/4642* (2013.01);
(Continued)

(58) Field of Classification Search
CPC .......... G06T 2207/10016; G06T 7/187; G06T 2207/20036; G06T 7/11;
(Continued)

(56) References Cited

U.S. PATENT DOCUMENTS 5,825,906 A * 10/1998 Obata ................ G06K 9/00154
382/116
6,138,045 A * 10/2000 Kupinski .............. G06T 7/0012
378/37
(Continued)

FOREIGN PATENT DOCUMENTS

EP 1532585 B1 12/2008

OTHER PUBLICATIONS

Rafael Grompone von Gioi, et al. (2012) LSD: A Line Segment Detector, Image Processing On Line, 2, pp. 35-55. Retrieved from https://doi.org/10.5201/ipol.2012.gjmr-lsd on Feb. 8, 2018. 21 pages.
(Continued)

*Primary Examiner* — Jingge Wu
(74) *Attorney, Agent, or Firm* — Lowenstein Sandler LLP

(57) ABSTRACT

The current document is directed to automated methods and systems, controlled by various constraints and parameters, that identify contours in digital images, including curved contours. Certain of these parameters constrain contour identification to those contours in which the local curvature of a contour does not exceed a threshold local curvature and to those contours orthogonal to intensity gradients of at least threshold magnitudes. The currently described methods and systems identify seed points within a digital image, extend line segments from the seed points as an initial contour coincident with the seed point, and then iteratively extend the initial contour by adding line segments to one or both ends of the contour. The identified contours are selectively combined and filtered in order to identify a set of relevant contours for use in subsequent image-processing tasks.

21 Claims, 34 Drawing Sheets

(51) Int. Cl.
*G06K 9/00* (2006.01)
*G06T 3/40* (2006.01)

(52) U.S. Cl.
CPC ......... *G06K 9/4647* (2013.01); *G06K 9/4652* (2013.01); *G06K 9/481* (2013.01); *G06T 3/4015* (2013.01); *G06K 2009/485* (2013.01); *G06T 2207/30176* (2013.01)

(58) Field of Classification Search
CPC . G06T 2207/20156; G06T 2207/30096; G06T 7/181; G06T 7/13; G06K 9/00771; G06K 9/4633; G06K 9/4647; G06K 9/481; G06K 9/4604; G06K 9/4652
See application file for complete search history.

(56) References Cited

U.S. PATENT DOCUMENTS

| | | | |
|---|---|---|---|
| 7,110,602 B2 | 9/2006 | Krause | |
| 7,873,216 B2 | 1/2011 | Zandifar et al. | |
| 8,107,766 B2 | 1/2012 | Kacher et al. | |
| 8,285,077 B2 | 10/2012 | Fero et al. | |
| 8,331,686 B2 | 12/2012 | Lee et al. | |
| 8,897,600 B1 | 11/2014 | Ma et al. | |
| 9,036,912 B2 | 5/2015 | Meyer et al. | |
| 9,208,403 B1 | 12/2015 | Aviv | |
| 9,390,342 B2 | 7/2016 | Campbell | |
| 9,495,735 B2 | 11/2016 | Wilson | |
| 9,805,281 B2 | 10/2017 | Wu | |
| 2002/0048402 A1* | 4/2002 | Braspenning | G06T 7/181 382/173 |
| 2002/0126893 A1* | 9/2002 | Held | G06K 9/0061 382/167 |
| 2003/0142884 A1 | 7/2003 | Cariffe | |
| 2004/0008890 A1* | 1/2004 | Clark | G06K 9/48 382/197 |
| 2004/0037460 A1* | 2/2004 | Luo | G06K 9/00228 382/165 |
| 2004/0037465 A1 | 2/2004 | Krause | |
| 2004/0213460 A1* | 10/2004 | Chen | G06K 9/00362 382/199 |
| 2006/0118633 A1* | 6/2006 | He | G06K 7/14 235/462.08 |
| 2007/0127816 A1* | 6/2007 | Balslev | G06K 9/48 382/181 |
| 2009/0046930 A1* | 2/2009 | Lee | G06K 9/4604 382/173 |
| 2009/0080738 A1* | 3/2009 | Zur | A61B 8/4254 382/131 |
| 2009/0190833 A1* | 7/2009 | Alvino | G06K 9/40 382/173 |
| 2009/0238462 A1* | 9/2009 | Feris | G06K 9/00771 382/190 |
| 2009/0274349 A1* | 11/2009 | Cascio | G06T 7/0012 382/128 |
| 2010/0111400 A1* | 5/2010 | Ramirez | G01N 15/1031 382/134 |
| 2011/0050703 A1* | 3/2011 | Artan | G06T 7/162 345/440 |
| 2012/0051606 A1* | 3/2012 | Saikia | G06T 7/62 382/128 |
| 2012/0243796 A1 | 9/2012 | Saito | |
| 2012/0320427 A1 | 12/2012 | Zheng et al. | |
| 2013/0064435 A1* | 3/2013 | Taerum | G06K 9/6207 382/128 |
| 2013/0148883 A1* | 6/2013 | Lee | G06K 9/3241 382/165 |
| 2013/0279801 A1* | 10/2013 | Scheuermann | G06T 7/0081 382/164 |
| 2014/0064596 A1 | 3/2014 | He | |
| 2014/0164927 A1 | 6/2014 | Salaverry | |
| 2014/0247470 A1 | 9/2014 | Hunt et al. | |
| 2014/0270500 A1* | 9/2014 | Li | G06K 9/6267 382/165 |
| 2015/0104098 A1 | 4/2015 | Axelsson | |
| 2015/0104106 A1* | 4/2015 | Elinas | G06K 9/4638 382/201 |
| 2015/0110392 A1* | 4/2015 | Wang | G06T 7/194 382/164 |
| 2016/0014392 A1* | 1/2016 | Liang | G06T 7/11 348/47 |
| 2016/0238737 A1* | 8/2016 | Janet | A01M 99/00 |
| 2017/0076169 A1 | 3/2017 | Campbell | |
| 2017/0351931 A1 | 12/2017 | Agrawal | |
| 2017/0365094 A1 | 12/2017 | Liu | |
| 2018/0018774 A1 | 1/2018 | Kacher et al. | |

OTHER PUBLICATIONS

R. Grompone von Gioi, et al. (2014) A Contrario Line Segment Detection, SpringerBriefs in Computer Science, DOI 10.1007/978-1-4939-0575-1. Available from http://www.springer.com/us/book/9781493905744?wt_mc=ThirdParty.SpringerLink.3.EPR653.About_eBook#otherversion=9781493905751. 90 pages.

Singh, et al., "A novel method for straightening curved text-lines in Stylistic documents" Springer, pp. 1-8, 2014.

Zhang et al., "Correcting document image warping based on regression of curved text lines" IEEE, pp. 1-6, 2003.

Pugliese, Alessandro, et al. "A Novel Model-based Dewarping Technique for Advanced Digital Library Systems", 10th Italian Research Conference on Digital Libraries, IRCDL 2014, https://doi.org/10.1016/j.procs.2014.10.018 Procedia Computer Science, vol. 38, 2014, pp. 108-115.

Zhang, Zheng, et al." Straightening Warped Text Lines Using Polynomial Regression", 2002 International Conference on Image Processing, Sep. 22-25, 2002, 4 pages.

* cited by examiner

METHOD AND SYSTEM FOR IDENTIFYING EXTENDED CONTOURS WITHIN DIGITAL IMAGES

CROSS-REFERENCE TO RELATED APPLICATIONS

The present application claims the benefit of priority under 35 USC 119 to Russian Patent Application No. 2016124833, filed Jun. 22, 2016 and Russian Patent Application No. 2016125288, filed Jun. 24, 2016; the present application is also related to the U.S. patent application Ser. No 15/195,759, filed Jun. 28, 2016, entitled "Method and Subsystem for Identifying Document Sub-Images Within Digital Images"; the disclosures of priority and related applications are incorporated herein by reference in their entirety for all purposes.

TECHNICAL FIELD

The current document is directed to image processing and, in particular, to a method and system that identifies contours within digital images, including curved contours, and that has particular application in identifying contours within digital images in preparation for various types of subsequent automated digital-image processing, including optical character recognition.

BACKGROUND

Printed natural-language documents continue to represent a widely used communications medium among individuals, within organizations, and for distribution of information among information consumers. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents. Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years. Computational optical-character-recognition methods and systems and electronic scanners together provide reliable and cost-effective imaging of printed documents and computational processing of the resulting digital images of text-containing documents to generate electronic documents corresponding to the printed documents. Designers, developers, manufacturers, and venders of computational optical-character-recognition methods and systems constantly seek new methods, systems, and subsystems that efficiently implement the many different types of automated processes applied to digital images during preparation of digital images for automated optical character recognition,

SUMMARY

The current document is directed to automated methods and systems, controlled by various constraints and parameters, that identify contours in digital images, including curved contours. Certain of these parameters constrain contour identification to those contours in which the local curvature of a contour does not exceed a threshold local curvature and to those contours orthogonal to intensity gradients of at least threshold magnitudes. The currently described methods and systems identify seed points within a digital image, extend line segments from the seed points as an initial contour coincident with the seed point, and then iteratively extend the initial contour by adding line segments to one or both ends of the contour. The identified contours are selectively combined and filtered in order to identify a set of relevant contours for use in subsequent image-processing tasks.

DETAILED DESCRIPTION

The current document is directed to methods and systems that identify contours, including curved contours, in digital images for use in subsequent digital-image processing tasks, including optical character recognition. In a first subsection, below, a short introduction to computer architecture, digital images, and digital-image methods is provided with reference to FIGS. 1-12. In a subsequent subsection, a detailed description of the currently disclosed methods and systems is provided with reference to FIGS. 13-26. In a final subsection, one implementation of the currently disclosed methods and systems is illustrated using control-flow diagrams, with reference to FIGS. 27A-G.

Overview

Figure 1:
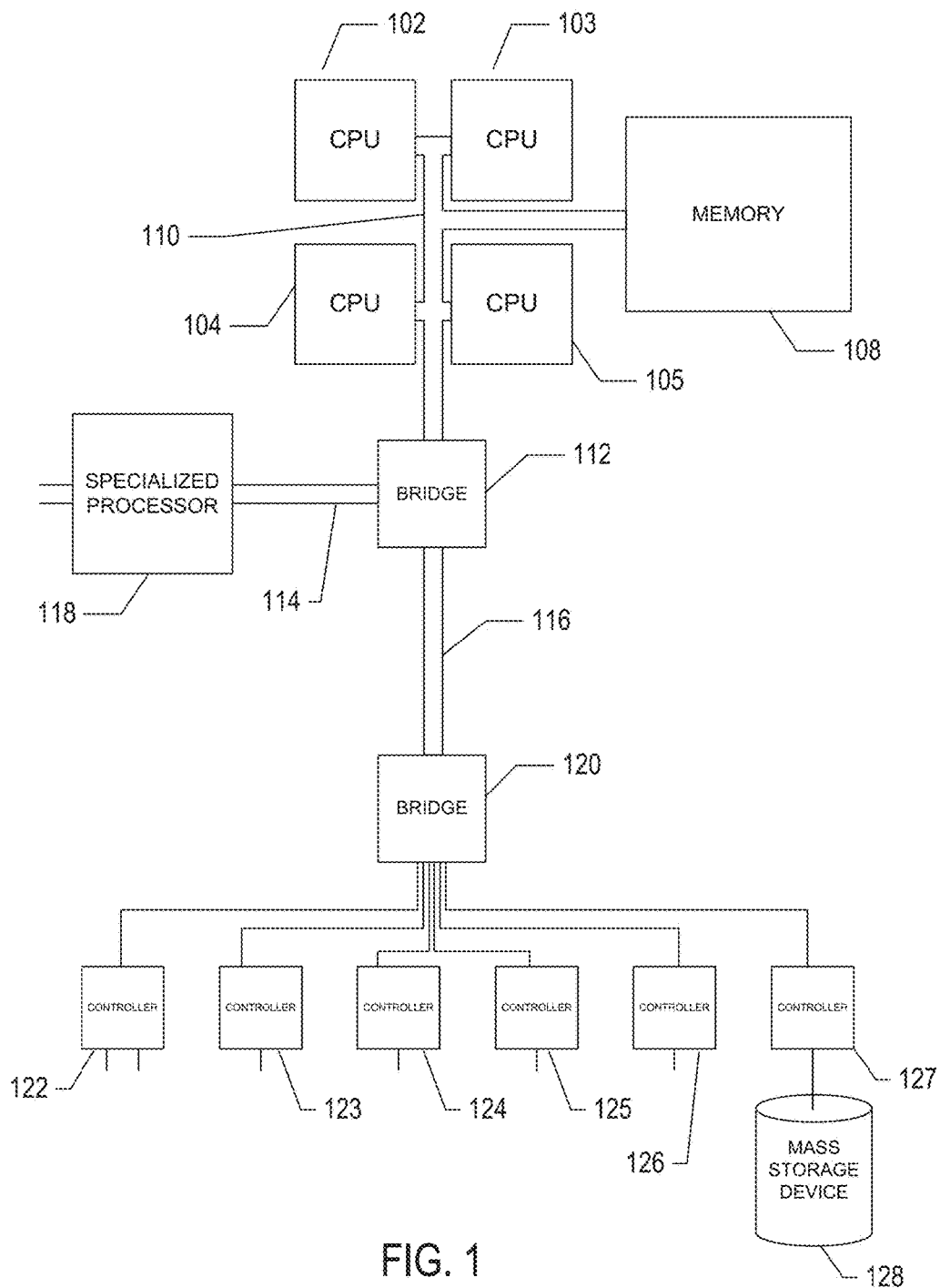
FIG. 1 provides a high-level architectural diagram of a computer system, such as a computer system in which the currently disclosed contour-identification methods are implemented.

FIG. 1 provides a high-level architectural diagram of a computer system, such as a computer system in which the currently disclosed contour-identification methods are implemented. Mobile imaging devices, including smart phones and digital cameras, can be similarly diagramed and also include processors, memory, and internal busses. Those familiar with modern technology and science well appreciate that a control program or control routine comprising computer instructions stored in a physical memory within a processor-controlled device constitute the control component for the device and are as physical, tangible, and important as any other component of an electromechanical device, including image-capturing devices. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2B:
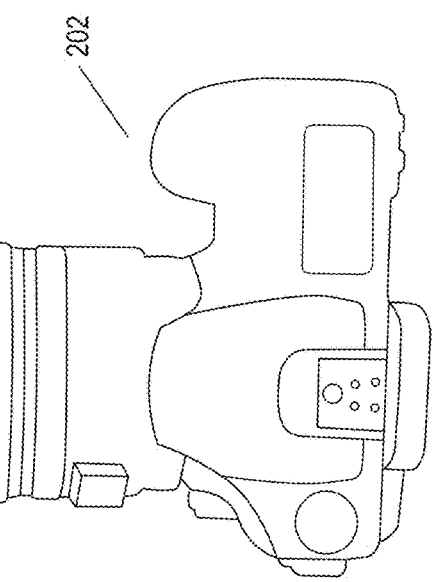
FIG. 2B illustrates two different types of hand-held imaging devices.
Figure 2A:
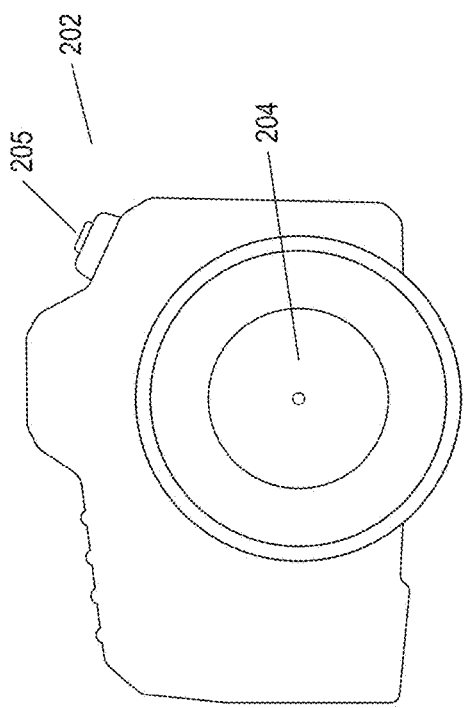
FIG. 2A illustrates two different types of hand-held imaging devices.
Figure 2C:
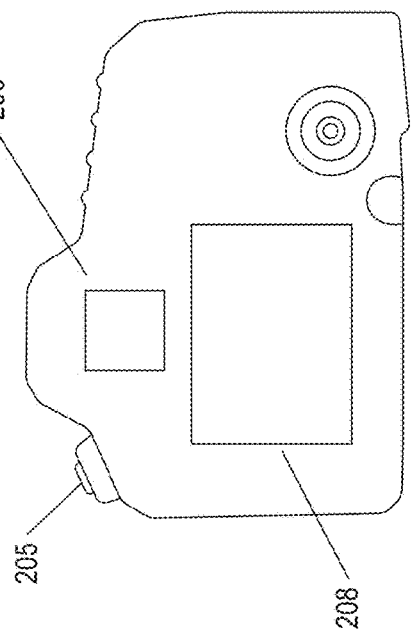
FIG. 2C illustrates two different types of hand-held imaging devices.

FIGS. 2A-D illustrate two different types of hand-held imaging devices. FIGS. 2A-C illustrate a digital camera 202. The digital camera includes an objective lens 204 and a shutter button 205 that, when depressed by a user, results in capture of a digital image corresponding to reflected light entering the lens 204 of the digital camera. On the back side of the digital camera, viewed by a user when the user is holding a camera to capture digital images, the digital camera includes a viewfinder 206 and an LCD viewfinder screen 208. The viewfinder 206 allows a user to directly view the image currently generated by the camera lens 204, while the LCD viewfinder screen 208 provides an electronic display of the image currently produced by the camera lens. Generally, the camera user adjusts the camera focus, using annular focus-adjusting features 210 while looking through the viewfinder 206 or observing the LCD viewfinder screen 208 in order to select a desired image prior to depressing the shutter button 205 to digitally capture the image and store the image in electronic memory within the digital camera.

Figure 2D:
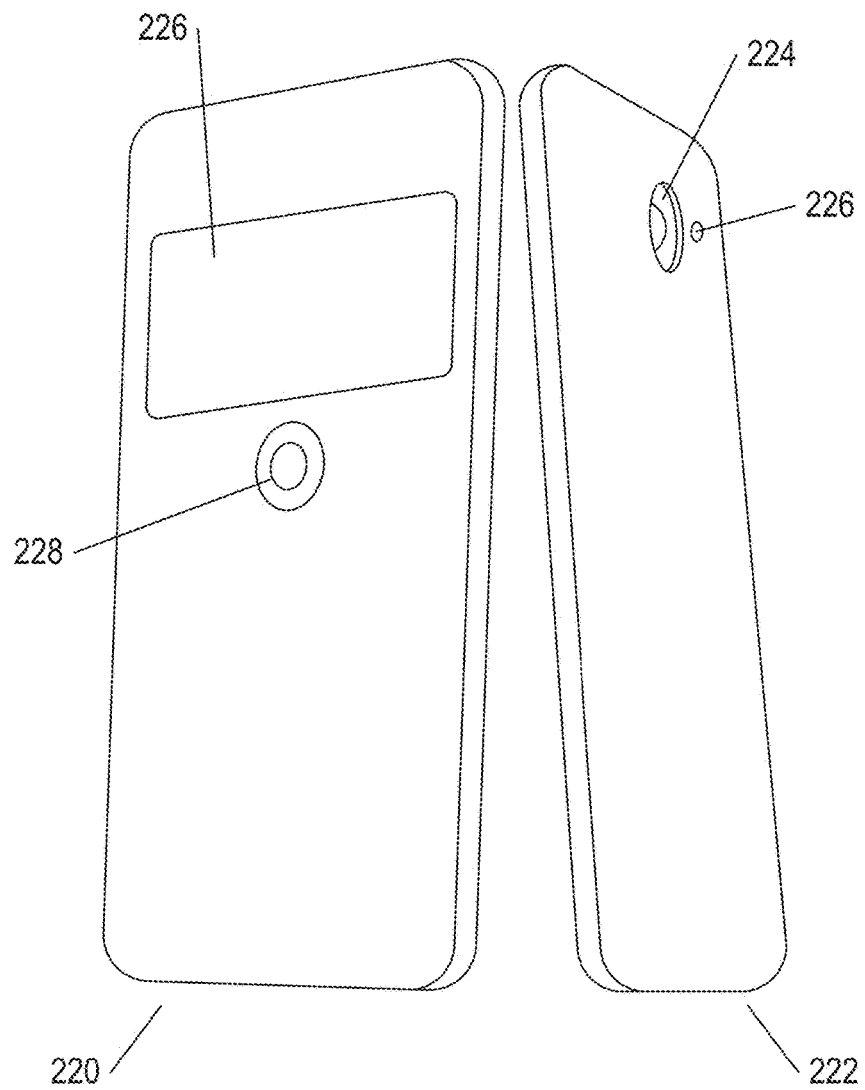
FIG. 2D illustrates two different types of hand-held imaging devices.

FIG. 2D shows a typical smart phone from the front side 220 and from the back side 222. The back side 222 includes a digital-camera lens 224 and digital light meter and/or proximity sensor 226. The front side of the smart phone 220 may, under application control, display the currently received image 226, similar to the LCD viewfinder display 208 of the digital camera, as well as a touch-sensitive shutter-button 228, input of a touch to which captures a digital image within the smart-phone memory.

Figure 3:
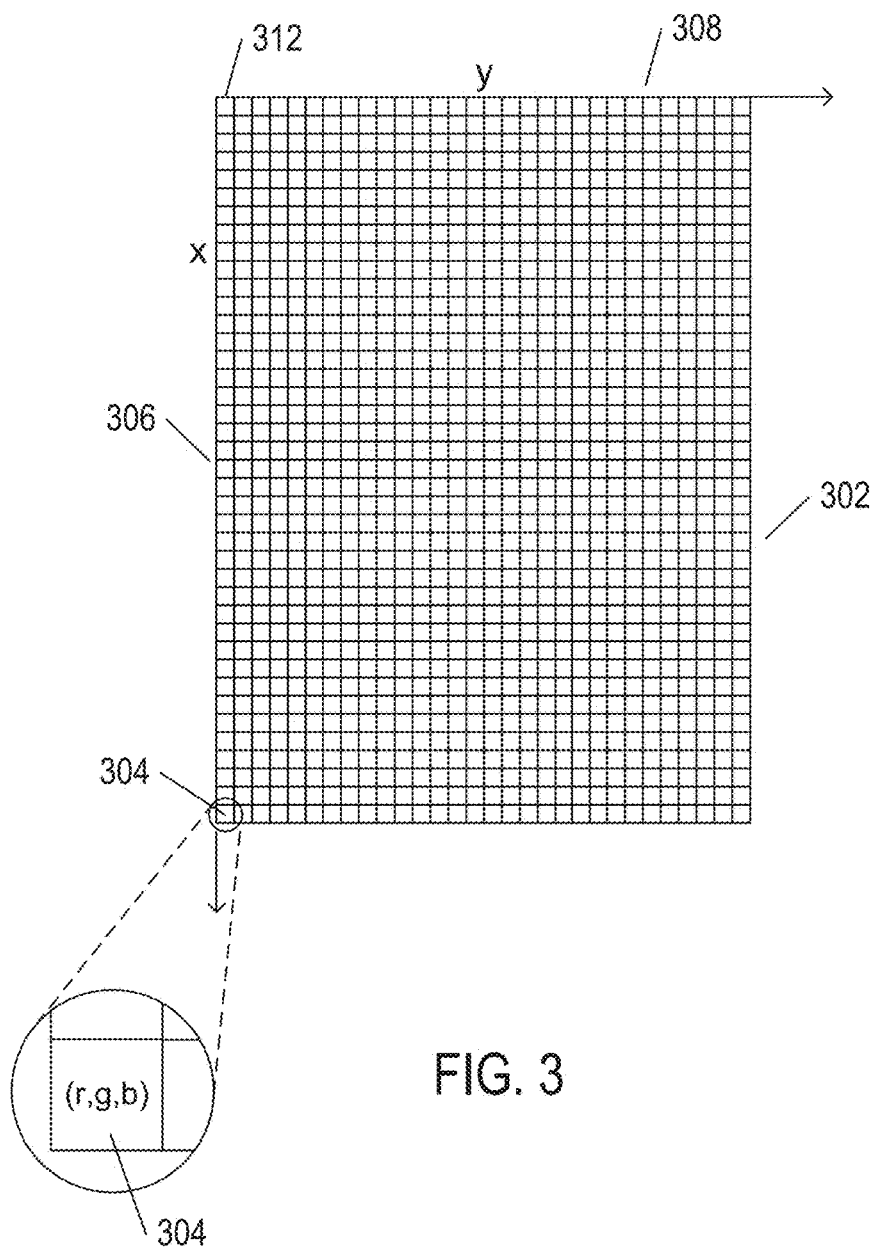
FIG. 3 illustrates a typical digitally encoded image.

FIG. 3 illustrates a typical digitally encoded image. The encoded image comprises a two dimensional array of pixels 302. In FIG. 3, each small square, such as square 304, is a pixel, generally defined as the smallest-granularity portion of an image that is numerically specified in the digital encoding. Each pixel is a location, generally represented as a pair of numeric values corresponding to orthogonal x and y axes 306 and 308, respectively. Thus, for example, pixel 304 has x, y coordinates (39,0), while pixel 312 has coordinates (0,0). In the digital encoding, the pixel is represented by numeric values that specify how the region of the image corresponding to the pixel is to be rendered upon printing, display on a computer screen, or other display. Commonly, for black-and-white images, a single numeric value range of 0-255 is used to represent each pixel, with the numeric value corresponding to the grayscale level at which the pixel is to be rendered. In a common convention, the value "0" represents black and the value "255" represents white. For color images, any of a variety of different color-specifying sets of numeric values may be employed. In one common color model, as shown in FIG. 3, each pixel is associated with three values, or coordinates (r,g,b), which specify the red, green, and blue intensity components of the color to be displayed in the region corresponding to the pixel.

Figure 4:
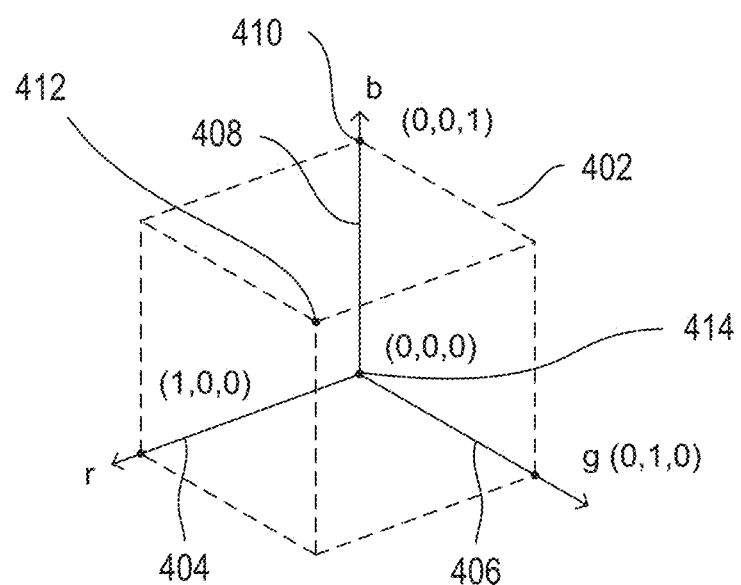
FIG. 4 illustrates one version of the RGB color model.

FIG. 4 illustrates one version of the RGB color model. The entire spectrum of colors is represented, as discussed above with reference to FIG. 3, by a three-primary-color coordinate (r,g,b). The color model can be considered to correspond to points within a unit cube 402 within a three-dimensional color space defined by three orthogonal axes: (1) r 404; (2) g 406; and (3) b 408. Thus, the individual color coordinates range from 0 to 1 along each of the three color axes. The pure blue color, for example, of greatest possible intensity corresponds to the point 410 on the b axis with coordinates (0,0,1). The color white corresponds to the point 412, with coordinates (1,1,1) and the color black corresponds to the point 414, the origin of the coordinate system, with coordinates (0,0,0).

Figure 5:
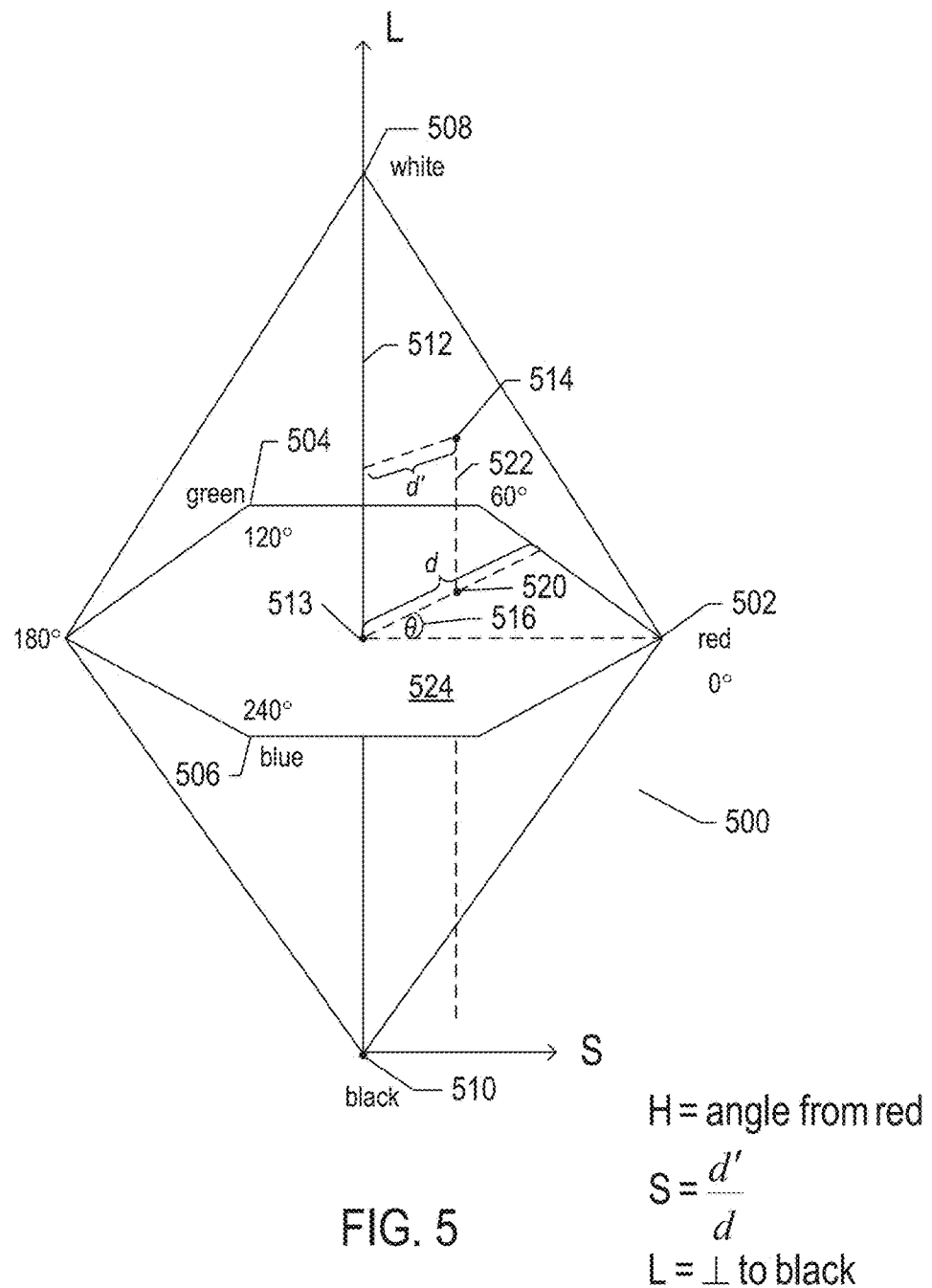
FIG. 5 shows a different color model, referred to as the "hue-saturation-lightness" ("HSL") color model.

FIG. 5 shows a different color model, referred to as the "hue-saturation-lightness" ("HSL") color model. In this color model, colors are contained within a three-dimensional bi-pyramidal prism 500 with a hexagonal cross section. Hue (h) is related to the dominant wavelength of a light radiation perceived by an observer. The value of the hue varies from 0° to 360° beginning with red 502 at 0°, passing through green 504 at 120°, blue 506 at 240°, and ending with red 502 at 660°. Saturation (s), which ranges from 0 to 1, is inversely related to the amount of white and black mixed with a particular wavelength, or hue. For example, the pure red color 502 is fully saturated, with saturation s=1.0, while the color pink has a saturation value less than 1.0 but greater than 0.0, white 508 is fully unsaturated, with s=0.0, and black 510 is also fully unsaturated, with s=0.0. Fully saturated colors fall on the perimeter of the middle hexagon that includes points 502, 504, and 506. A gray scale extends from black 510 to white 508 along the central vertical axis 512, representing fully unsaturated colors with no hue but different proportional combinations of black and white. For example, black 510 contains 100% of black and no white, white 508 contains 100% of white and no black and the origin 513 contains 50% of black and 50% of white. Lightness (l), or luma, represented by the central vertical axis 512, indicates the illumination level, ranging from 0 at black 510, with l=0.0, to 1 at white 508, with l=1.0. For an arbitrary color, represented in FIG. 5 by point 514, the hue is defined as angle θ 516, between a first vector from the origin 513 to point 502 and a second vector from the origin 513 to point 520 where a vertical line 522 that passes through point 514 intersects the plane 524 that includes the origin 513 and points 502, 504, and 506. The saturation is represented by the ratio of the distance of representative point 514 from the vertical axis 512, d', divided by the length of a horizontal line passing through point 520 from the origin 513 to the surface of the bi-pyramidal prism 500, d. The lightness is the vertical distance from representative point 514 to the vertical level of the point representing black 510. The coordinates for a particular color in the HSL color model, (h,s,l), can be obtained from the coordinates of the color in the RGB color model, (r,g,b), as follows:

$$l = \frac{(C_{max} - C_{min})}{2},$$

$$h = \begin{cases} 60° \times \left(\frac{g-b}{\Delta} \mod 6\right), & \text{when } C_{max} = r \\ 60° \times \left(\frac{b-r}{\Delta} + 2\right), & \text{when } C_{max} = g \\ 60° \times \left(\frac{r-g}{\Delta} + 4\right), & \text{when } C_{max} = b \end{cases},$$

and $$s = \begin{cases} 0, \Delta = 0 \\ \frac{\Delta}{1 - |2l - 1|}, \text{otherwise} \end{cases},$$

where r, g, and b values are intensities of red, green, and blue primaries normalized to the range [0, 1]; $C_{max}$ is a normalized intensity value equal to the maximum of r, g, and b; $C_{min}$ is a normalized intensity value equal to the minimum of r, g, and b; and Δ is defined as $C_{max} - C_{min}$.

Figure 6:
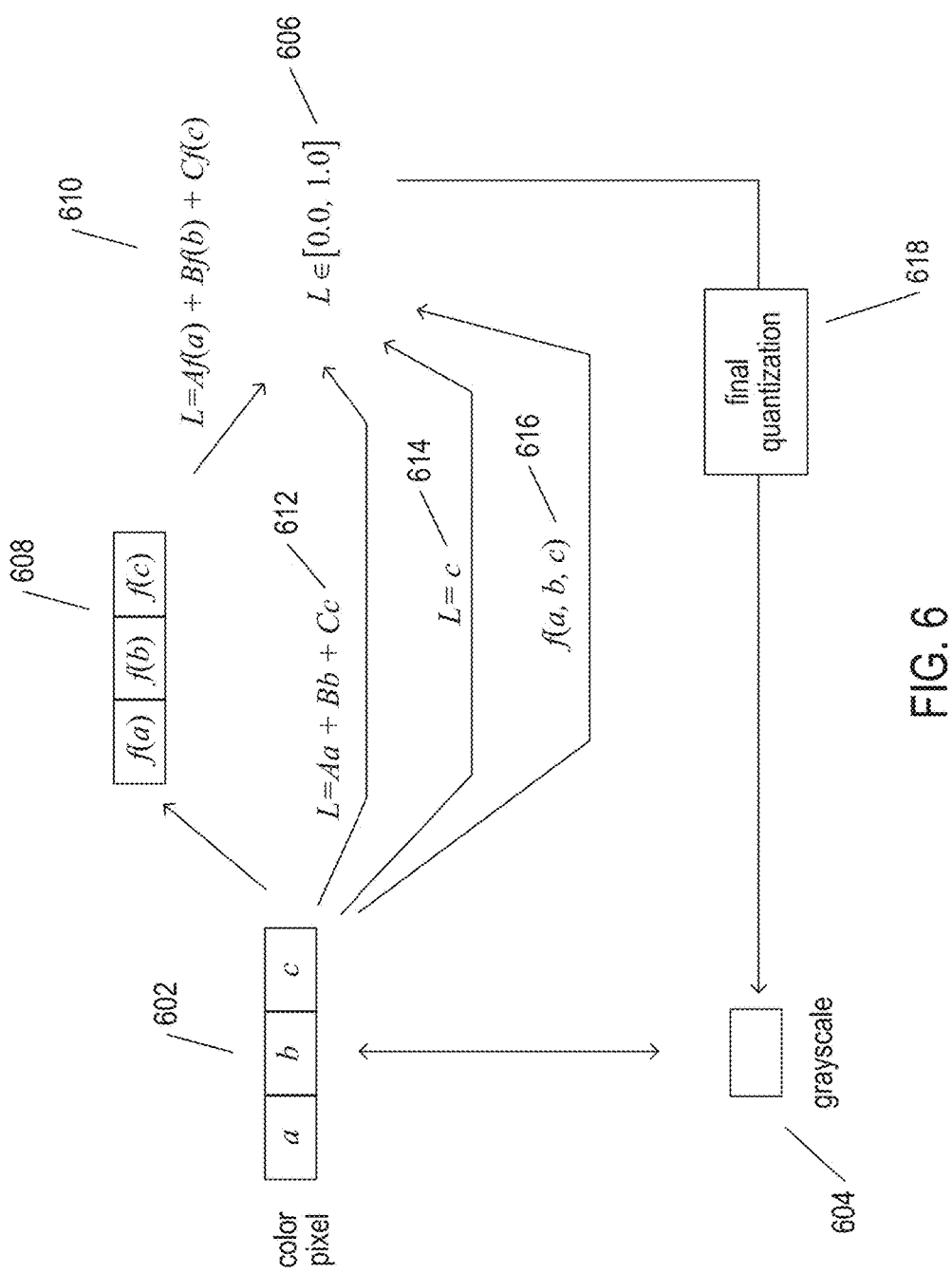
FIG. 6 illustrates generation of a grayscale or binary image from a color image.

FIG. 6 illustrates generation of a grayscale or binary image from a color image. In a color image, each pixel is generally associated with three values: a, b, and c 602. Different color models employ different values of a, b, and c to represent a particular color. A grayscale image includes only a single intensity value 604 for each pixel. A binary image is a special case of a grayscale image with only two different intensity values, "0" and "1." Commonly, grayscale images may have 256 or 65,536 different intensity values, with each pixel represented by a byte or 16-bit word, respectively. Thus, to transform a color image to grayscale, the three values a, b, and c in the color pixels need to be translated to single intensity values for the grayscale or binary image. In a first step, the three color values a, b, and c are transformed to a luminosity value L, generally in a range of [0.0, 1.0] 606. For certain color models, a function is applied to each of the color values 608 and the results are summed 610 to produce the luminosity value. In other color models, each color value is multiplied by a coefficient and the results are summed 612 to produce the luminosity value. In yet other color systems, one of the three color values is, in fact, the luminosity value 614. Finally, in the general case, a function is applied to the three color values 616 to produce the luminosity value. The luminosity value is then quantized 618 to produce a grayscale intensity value within the desired range, generally [0, 255] for grayscale images and (0,1) for binary images.

Figure 7:
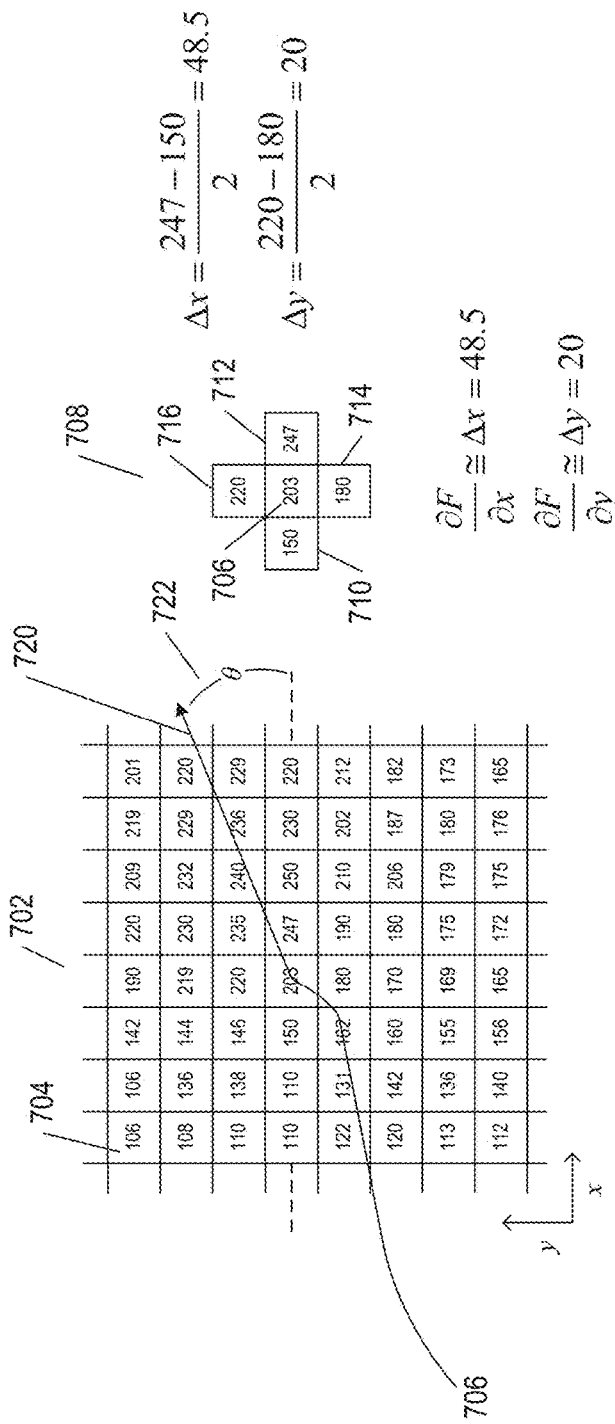
FIG. 7 illustrates a discrete computation of an intensity gradient.

FIG. 7 illustrates a discrete computation of an intensity gradient. In FIG. 7, a small square portion 702 of a digital image is shown. Each cell, such as cell 704, represents a pixel and the numeric value within the cell, such as the value "106" in cell 704, represents a grayscale intensity. Consider pixel 706 with the intensity value "203." This pixel, and four contiguous neighbors, are shown in the cross-like diagram 708 to the right of the portion 702 of the digital image. Considering the left 710 and right 712 neighbor pixels, the change in intensity value in the x direction, Δx, can be discretely computed as:

$$\Delta x = \frac{247 - 150}{2} = 48.5.$$

Considering the lower 714 and upper 716 pixel neighbors, the change in intensity in the vertical direction, Δy, can be computed as:

$$\Delta y = \frac{220 - 180}{2} = 20.$$

The computed Δx is an estimate of the partial differential of the continuous intensity function with respect to the x coordinate at the central pixel 706:

$$\frac{\partial F}{\partial x} \cong \Delta x = 48.5.$$

The partial differential of the intensity function F with respect to the y coordinate at the central pixel 706 is estimated by Δy:

$$\frac{\partial F}{\partial y} \cong \Delta y = 20.$$

The intensity gradient at pixel 706 can then be estimated as:

$$\text{gradient} = \nabla F = \frac{\partial F}{\partial x} i + \frac{\partial F}{\partial y} j = 48.5i + 20j$$

where i and j are the unit vectors in the x and y directions. The magnitude of the gradient vector and the angle of the gradient vector are then computed as:

$$|\text{gradient}| = \sqrt{48.5^2 + 20^2} = 52.5$$

$$\theta = \text{atan } 2(20, 48.5) = 22.4.$$

The function atan 2(y, x) is defined as: (1) arctan(y/x), when x>0; (2) arctan(y/x)+π, when x<0 and y≥0; (3) arctan(y/x)−π, when x<0 and y<0; (4) π/2, when x=0 and y>0; (5) −π/2, when x=0 and y<0; and (6) undefined, when x=0 and y=0. The direction of the intensity gradient vector 720 and the angle θ 722 are shown superimposed over the portion 702 of the digital image in FIG. 7. Note that the gradient vector points in the direction of steepest increase in intensity from pixel 706. The magnitude of the gradient vector indicates an expected increase in intensity per unit increment in the gradient direction. Of course, because the gradient is only estimated by discrete operations, in the computation illustrated in FIG. 7, both the direction and magnitude of the gradient are merely estimates.

Figure 8:
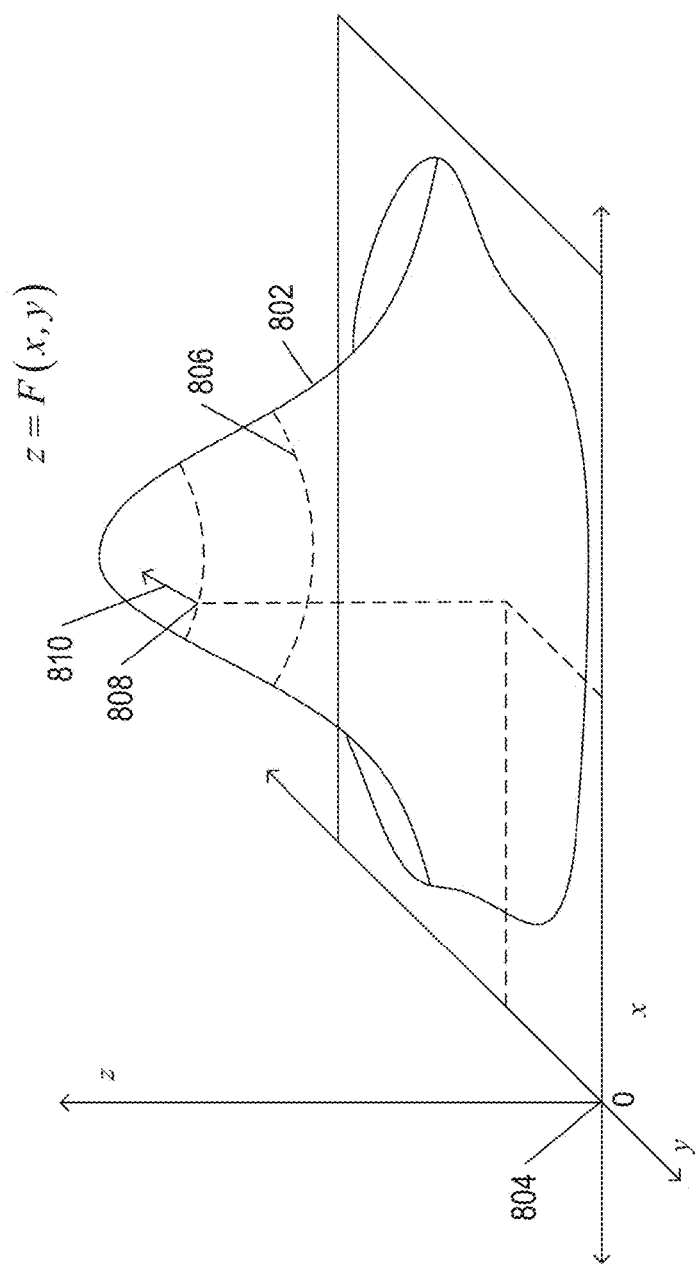
FIG. 8 illustrates a gradient computed for a point on a continuous surface.

FIG. 8 illustrates a gradient computed for a point on a continuous surface. FIG. 8 illustrates a continuous surface z=F(x,y). The continuous surface 802 is plotted with respect to a three-dimensional Cartesian coordinate system 804, and has a hat-like shape. Contour lines, such as contour line 806, can be plotted on the surface to indicate a continuous set of points with a constant z value. At a particular point 808 on a contour plotted on the surface, the gradient vector 810 computed for the point is perpendicular to the contour line and points in the direction of the steepest increase along the surface from point 808.

Figure 9:
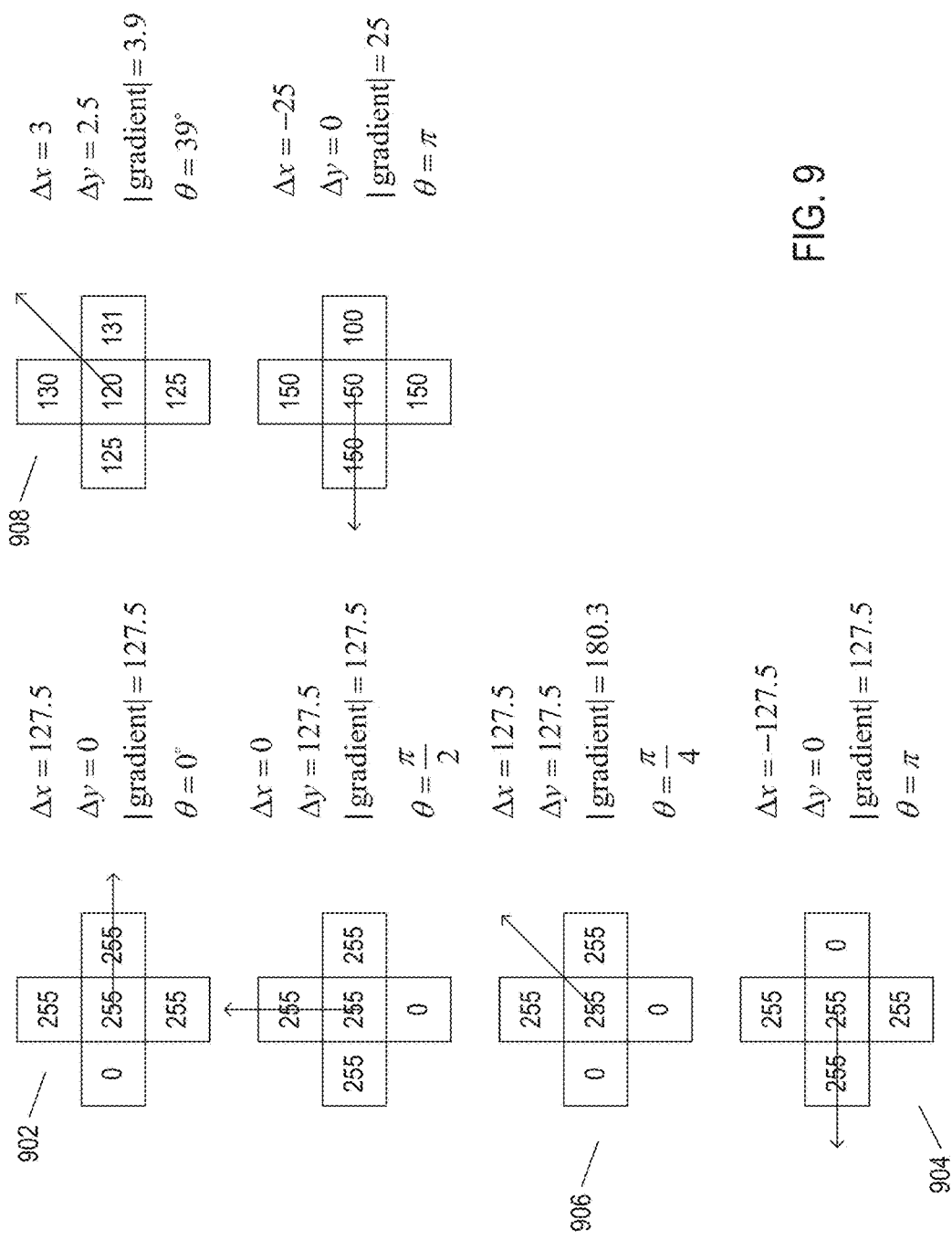
FIG. 9 illustrates a number of intensity-gradient examples.

In general, an intensity gradient vector is oriented perpendicularly to an intensity edge, and the greater the magnitude of the gradient, the sharper the edge or the greatest difference in intensities of the pixels on either side of the edge. FIG. 9 illustrates a number of intensity-gradient examples. Each example, such as example 902, includes a central pixel for which the gradient is computed and the four contiguous neighbors used to compute Δx and Δy. The sharpest intensity boundaries are shown in the first column 904. In these cases, the magnitude of the gradient is at least 127.5 and, for the third case 906, 180.3. A relatively small difference across an edge, shown in example 908, produces a gradient with a magnitude of only 3.9. In all cases, the gradient vector is perpendicular to the apparent direction of the intensity edge through the central pixel.

Figure 10:
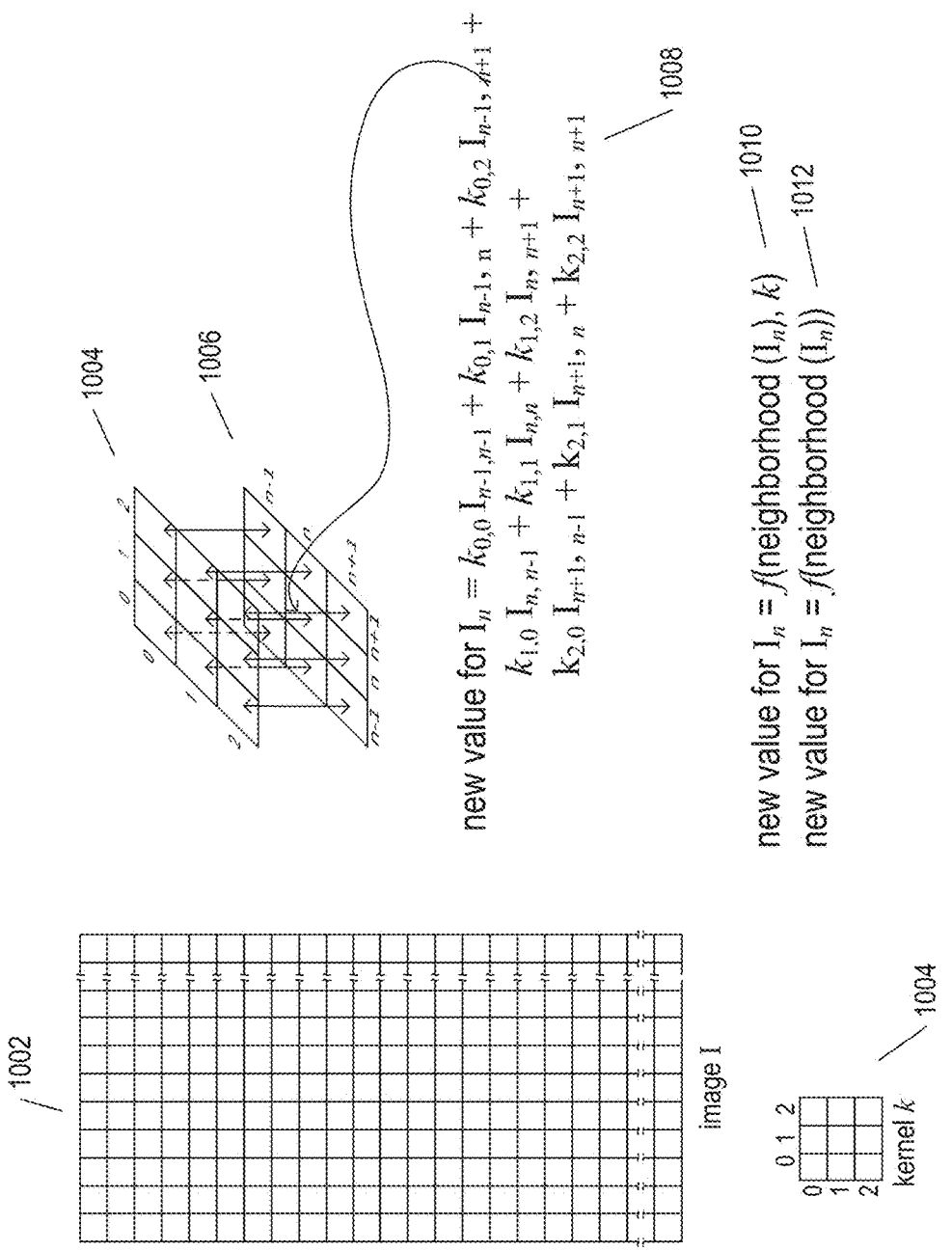
FIG. 10 illustrates application of a kernel to an image.

Many image-processing methods involve application of kernels to the pixel grid that constitutes the image. FIG. 10 illustrates application of a kernel to an image. In FIG. 10, a small portion of an image 1002 is shown as a rectilinear grid of pixels. A small 3×3 kernel k 1004 is shown below the representation of image I 1002. A kernel is applied to each pixel of the image. In the case of a 3×3 kernel, such as kernel k 1004 shown in FIG. 10, a modified kernel may be used for edge pixels or the image can be expanded by copying the intensity values in edge pixels to a circumscribing rectangle of pixels so that the kernel can be applied to each pixel of the original image. To apply the kernel to an image pixel, the kernel 1004 is computationally layered over a neighborhood of the pixel to which the kernel is applied 1006 having the same dimensions, in pixels, as the kernel. Application of the kernel to the neighborhood of the pixel to which the kernel is applied produces a new value for the pixel in a transformed image produced by applying the kernel to pixels of the original image. In certain types of kernels, the new value for the pixel to which the kernel is applied, $I_n$, is obtained as the sum of the products of the kernel value and pixel aligned with the kernel value 1008. In other cases, the new value for the pixel is a more complex function of the neighborhood about the pixel and the kernel 1010. In yet other types of image processing, a new value for a pixel is generated by a function applied to the neighborhood of the pixel, without using a kernel 1012.

Figure 11:
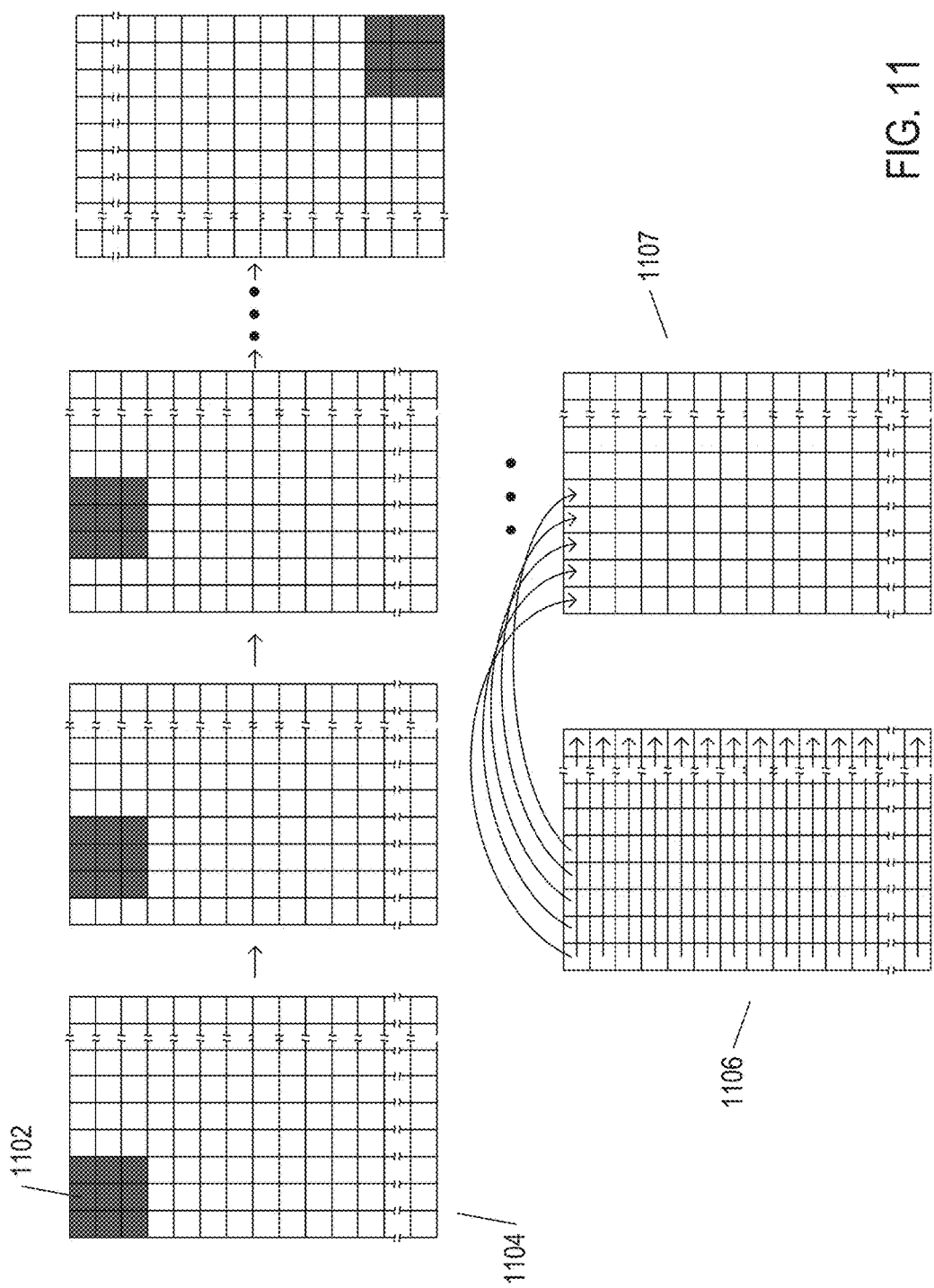
FIG. 11 illustrates convolution of a kernel with an image.

FIG. 11 illustrates convolution of a kernel with an image. In general, the kernel is sequentially applied to each pixel of an image, in some cases, into each non-edge pixel of an image; in other cases, to produce new values for a transformed image. In FIG. 11, a 3×3 kernel, shown by shading 1102, is sequentially applied to the first row of non-edge pixels in an image 1104. Each new value generated by application of a kernel to a pixel in the original image 1106 is then placed into the transformed image 1107. In other words, the kernel is sequentially applied to the original neighborhoods of each pixel in the original image to produce the transformed image. This process is referred to as "convolution," and is loosely related to the mathematical convolution operation computed by multiplying Fourier-transformed images and then carrying out an inverse Fourier transform on the product.

Figure 12:
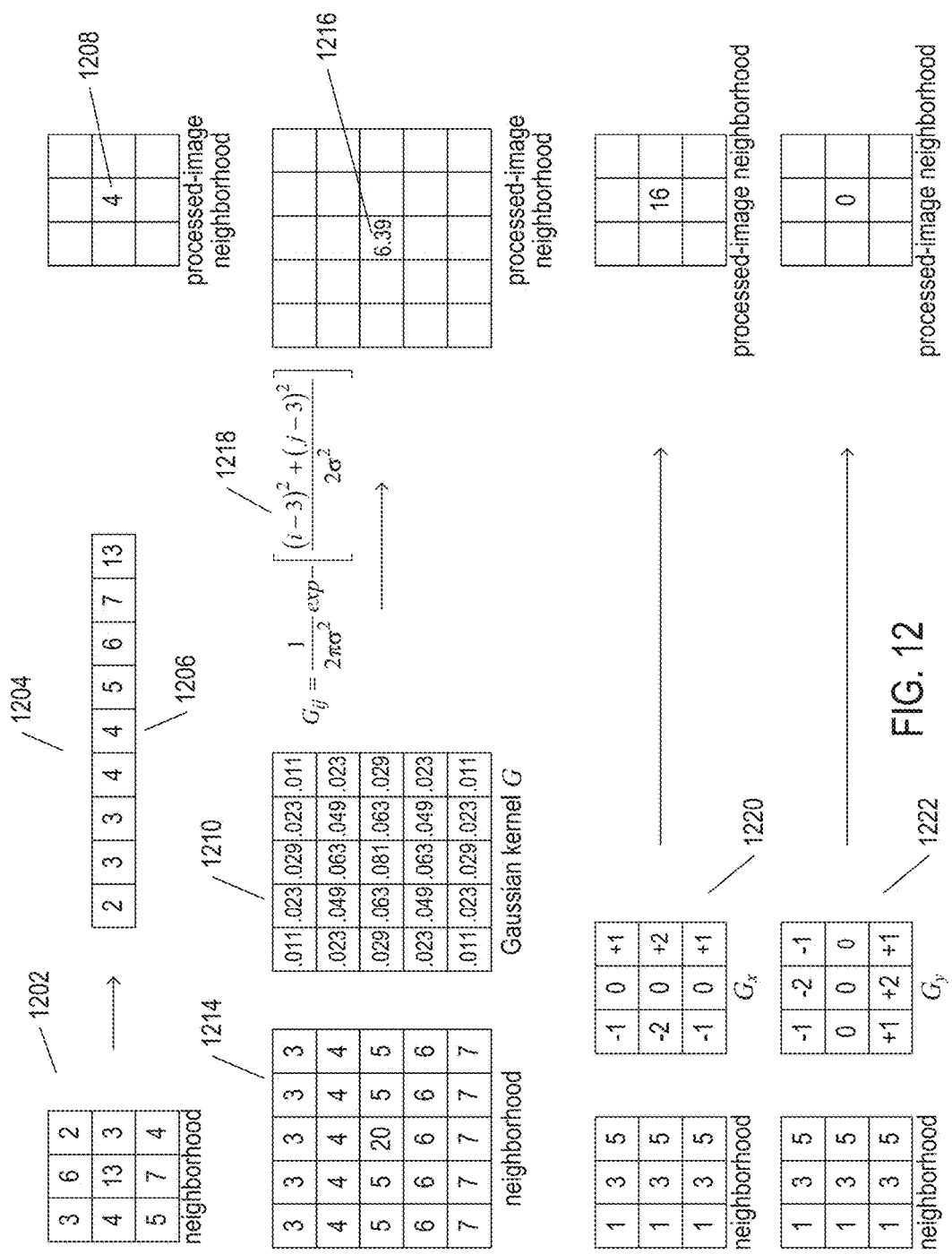
FIG. 12 illustrates some example kernel and kernel-like image-processing techniques.

FIG. 12 illustrates some example kernel and kernel-like image-processing techniques. In the process referred to as "median filtering," the intensity values in a neighborhood of the original image 1202 are sorted 1204 in ascending-magnitude order and the median value 1206 is selected as a new value 1208 for the corresponding neighborhood of the transformed image. Gaussian smoothing and denoising involves applying a Gaussian kernel 1210 to each neighborhood 1214 of the original image to produce the value for the central pixel of the neighborhood 1216 in the corresponding neighborhood of the processed image. The values in the Gaussian kernel are computed by an expression such as expression 1218 to produce a discrete representation of a Gaussian surface above the neighborhood formed by rotation of a bell-shaped curve about a vertical axis coincident with the central pixel. The horizontal and vertical components of the image gradient for each pixel can be obtained by application of the corresponding $G_x$ 1220 and $G_y$ 1222 gradient kernels. These are only three of the many different types of convolution-based image-processing techniques.

Methods and Systems to which the Current Document is Directed

Figure 13:
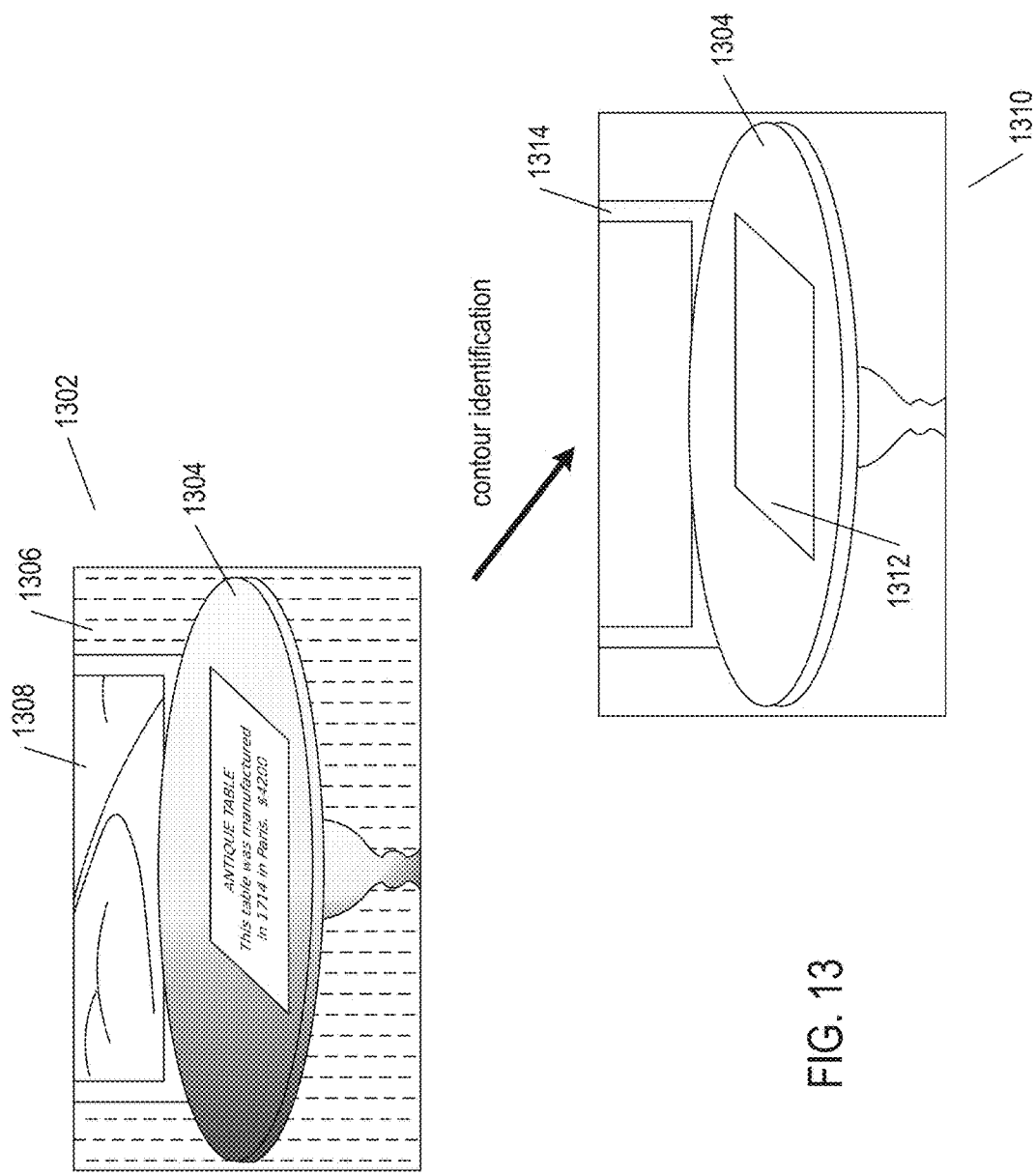
FIG. 13 illustrates a general approach to contour identification used in the currently disclosed methods and systems.
Figure 14:
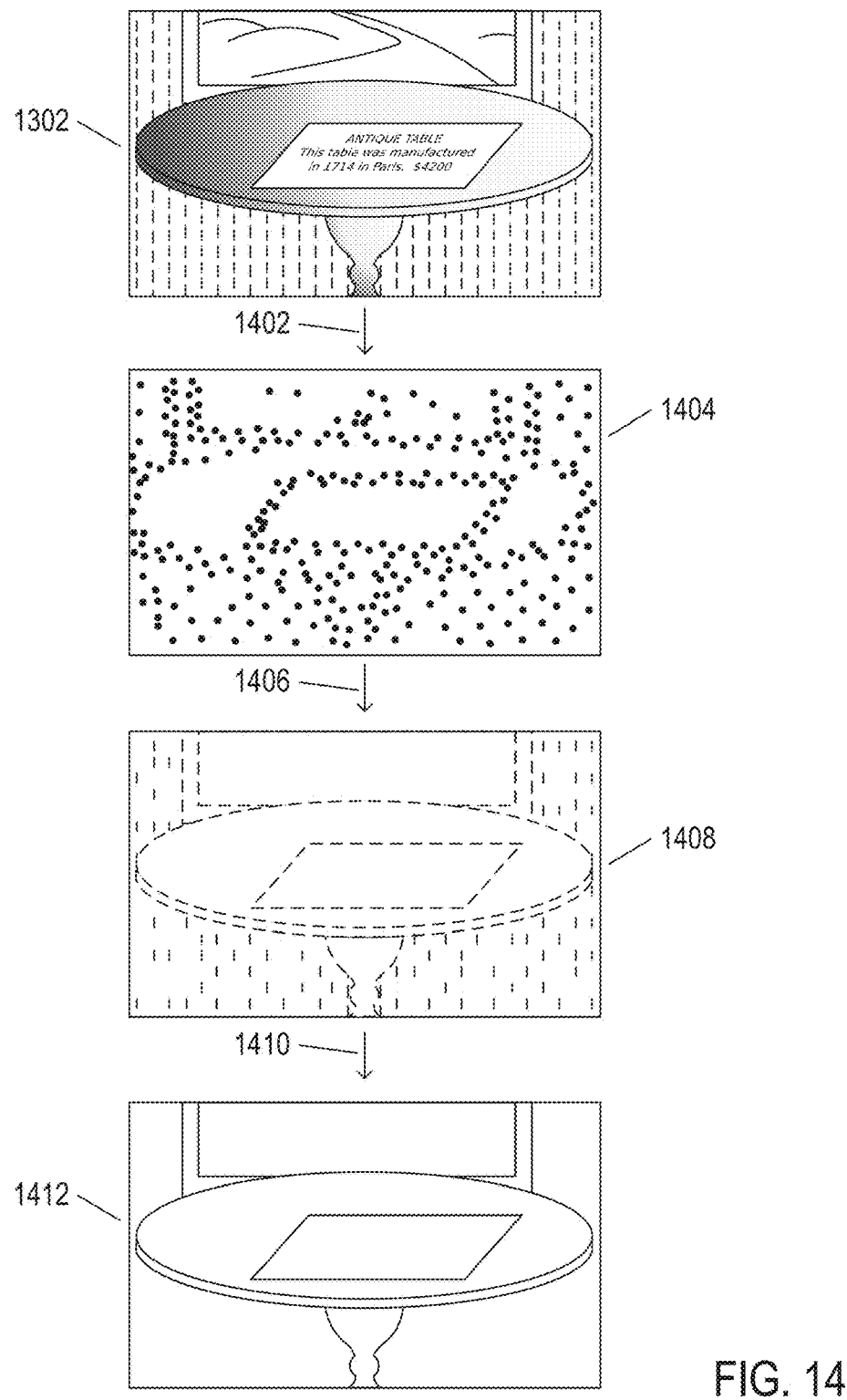
FIG. 14 illustrates a general approach to contour identification used in the currently disclosed methods and systems.

FIGS. 13-14 illustrate a general approach to contour identification used in the currently disclosed methods and systems. FIG. 13 illustrates an example contour-identification carried out on an example digital image according to the currently disclosed methods and systems. The digital image 1302 is a photograph of a table 1304 that is positioned near a wall 1306, covered with wallpaper, in which a window 1308 looks out over an outside landscape scene. In this example, the digital image is intended to be automatically processed in order to identify physical objects of interest. In a first series of digital-image-processing steps, contours likely to correspond to edges and borders of physical objects of interest are identified, using the currently disclosed contour-identification methods that identify contours lying along intensity edges within the digital image. Contour identification produces the contour map 1310 that includes contours corresponding to the edges of the table 1304, contours corresponding to the edges of a document lying on the table 1312, and contours corresponding to a portion of a window frame 1314. Other undesired contours corresponding to intensity edges have either not been identified, due to constraints and parameter values that control contour identification, or have been filtered from the contour map. Additional digital-image-processing steps can then be carried out to use the identified contours, along with additional information within the original image 1302, to recognize and classify physical objects in the image, including the table, document, and window frame. As mentioned above, currently disclosed methods and systems employ various constraints and parameters to control contour identification in order to identify contours useful for specific purposes. For instance, in the example shown in FIG. 13, there are many intensity edges in the original image 1302 corresponding to a pattern of dashed stripes in the wallpaper on the wall 1306 behind the table. A parameter that controls the minimum length for identified contours can be set to a value that excludes the wallpaper pattern. The constraints and parameter values are determined, in part, by the subsequent digital-image processing steps that are intended to be applied to the digital image.

FIG. 14 illustrates the overall approach to contour identification used in the currently disclosed methods and systems. In a first step 1402, the original image 1302 is processed to identify candidate starting points, or seed points, from which contours can be constructed and extended. The result of the first step can be thought of as a seed-point map 1404. In a second step 1406, initial edges are extended, in two directions, from each seed point to generate initial, incipient contours 1408. In a final step 1410, the incipient contours are extended and combined to produce a result set of contours, which may be then filtered in order to produce a set of identified contours 1412 that can be used for subsequent image-processing tasks. As discussed in detail below, each of the steps 1402, 1406, and 1410 shown in FIG. 14 involve numerous processes and sub-processes. These processes and sub-processes rely on generating and storing numerous different types of intermediate results and data in memory and data-storage devices. Different implementations of the currently disclosed methods and systems may use various different types of data representations and intermediate results. For example, an intermediate result may be a two-dimensional map, with elements corresponding to pixels of the digital image in one implementation, but may, in a different implementation, constitute stored data structures that include references to the original image or intermediate maps.

FIGS. 15-26 illustrate a particular implementation of the currently disclosed methods and systems. FIGS. 15-26 provide detailed, step-by-step illustrations to facilitate understanding of the flow-control diagrams and the discussion of the flow-control diagrams with respect to which the implementation is described in a following subsection.

Figure 15:
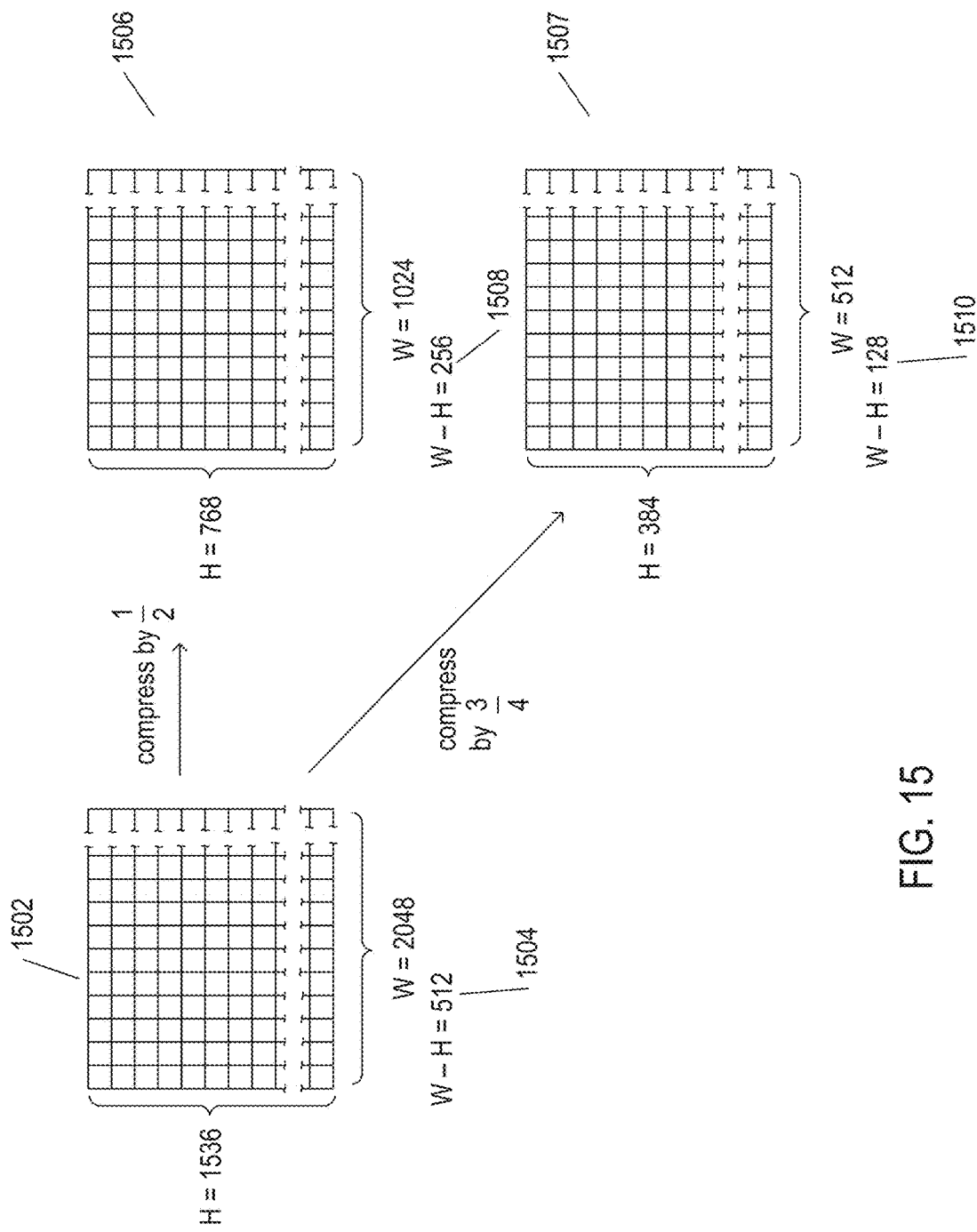
FIG. 15 illustrates a particular implementation of the currently disclosed methods and systems.

FIG. 15 illustrates a first compression step. In FIG. 15, the originally received digital image 1502 has a height, in pixels, of 1536 and a width, in pixels, of 2048. The difference between the height and width is 512 pixels 1504. The original image 1502 is compressed by different compression ratios to produce compressed images 1506 and 1507. The first compressed image 1506 is compressed by a compression ratio of 1/2 and has, as a result, a height of 768 pixels and a width of 1024 pixels. The difference between the width and height of the compressed image is 256 pixels 1508. The second compressed image is compressed by a compression ratio of 3/4, with the difference between the width and height in the second compressed image equal to 128 pixels 1510. In the currently described implementation, the original image is compressed, by one or more different compression ratios, to generate one or more corresponding compressed images in which the difference between the width and height of the image is below a threshold number of pixels, such as below 300 pixels. Various different methods can be used to compress the digital image. In one simple method, evenly spaced rows and columns of pixels are removed from the original image to generate the compressed images. More complex methods may carry out various smoothing, shifting, and interpolation methods to ensure that desired detail is not inadvertently removed or significantly altered during the compression operation.

Figure 16:
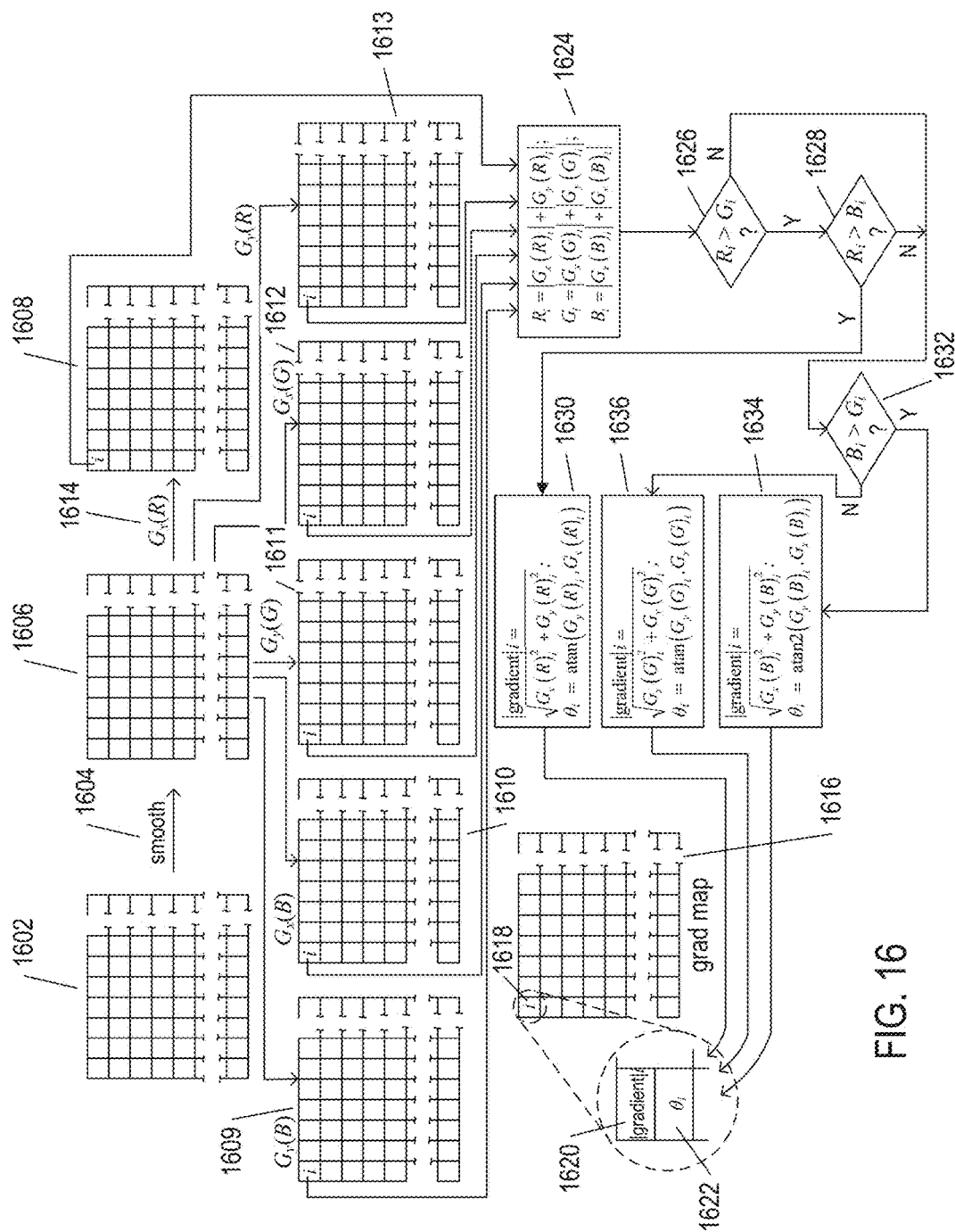
FIG. 16 illustrates a particular implementation of the currently disclosed methods and systems.

FIG. 16 shows a next processing step in the contour-identification-process implementation. The original image, or a compressed version of the original image 1602, is smoothed 1604 using a median filter or convolution with a Gaussian kernel, to produce a corresponding smoothed image 1606. Then, the gradient kernels $G_x$ and $G_y$ are applied to each color channel of the smoothed image to produce three pairs of horizontal-gradient-component and vertical-gradient-component maps 1608-1613. For example, the horizontal-gradient-component kernel convolved with the red channel of the smoothed image 1614 produces the horizontal-gradient-component map for the red channel 1608. The notation "$G_i(X)$" is used both to indicate convolution of the gradient-component kernel in the i direction with the X color channel of an image as well as to indicate the gradient-component map produced by the convolution. With the six gradient-component maps 1608-1613 generated and stored in memory, or, alternatively, generated on the fly, the magnitudes of the gradient components are used to produce a gradient map, referred to as the "grad map," 1616. Each element of the grad map, such as element i 1618, includes the gradient magnitude 1620 and the orientation angle of the gradient 1622. The small control-flow diagram in FIG. 16 illustrates how the grad map is generated. First, in step 1624, the sum of the absolute values of the gradient components are computed for each color channel and stored in the variables $R_i$, $G_i$, and $B_i$. When $R_i$ is greater than $G_i$, as determined in step 1626, and when $R_i$ is greater than $B_i$, as determined in step 1628, the gradient for cell or pixel i is computed, in step 1630, using the gradient components for the red channel. When $R_i$ is not greater than both $G_i$ and $B_i$, then, in step 1632, a determination is made whether $B_i$ is greater than $G_i$. When $B_i$ is greater than $G_i$, the gradient magnitude and orientation for cell or pixel i is computed from the blue-channel gradient components, in step 1634. Otherwise, the gradient magnitude and orientation angle are computed from the green-channel gradient components in step 1636. This process, illustrated in the control-flow diagram 1624, 1626, 1628, 1630, 1632, 1634, and 1636, is repeated for each pixel or cell i within the smoothed image 1606. Note that, in certain implementations, convolutions are carried out only on pixels of an image within pixel neighborhoods over which the kernel can be completely overlaid, as a result of which the map produced by convolution has fewer columns and rows than the original map. In other implementations, either the original image is extended, by copying, so that kernels can be applied to all pixels or cells within the image or modified kernels are used for border pixels and cells. The grad map 1616 is a map of the magnitudes and orientations of the gradients for each pixel or cell of the smoothed image, with the gradient for each pixel based on the color channel of the smoothed image for which the sum of the gradient components is maximum.

Figure 17:
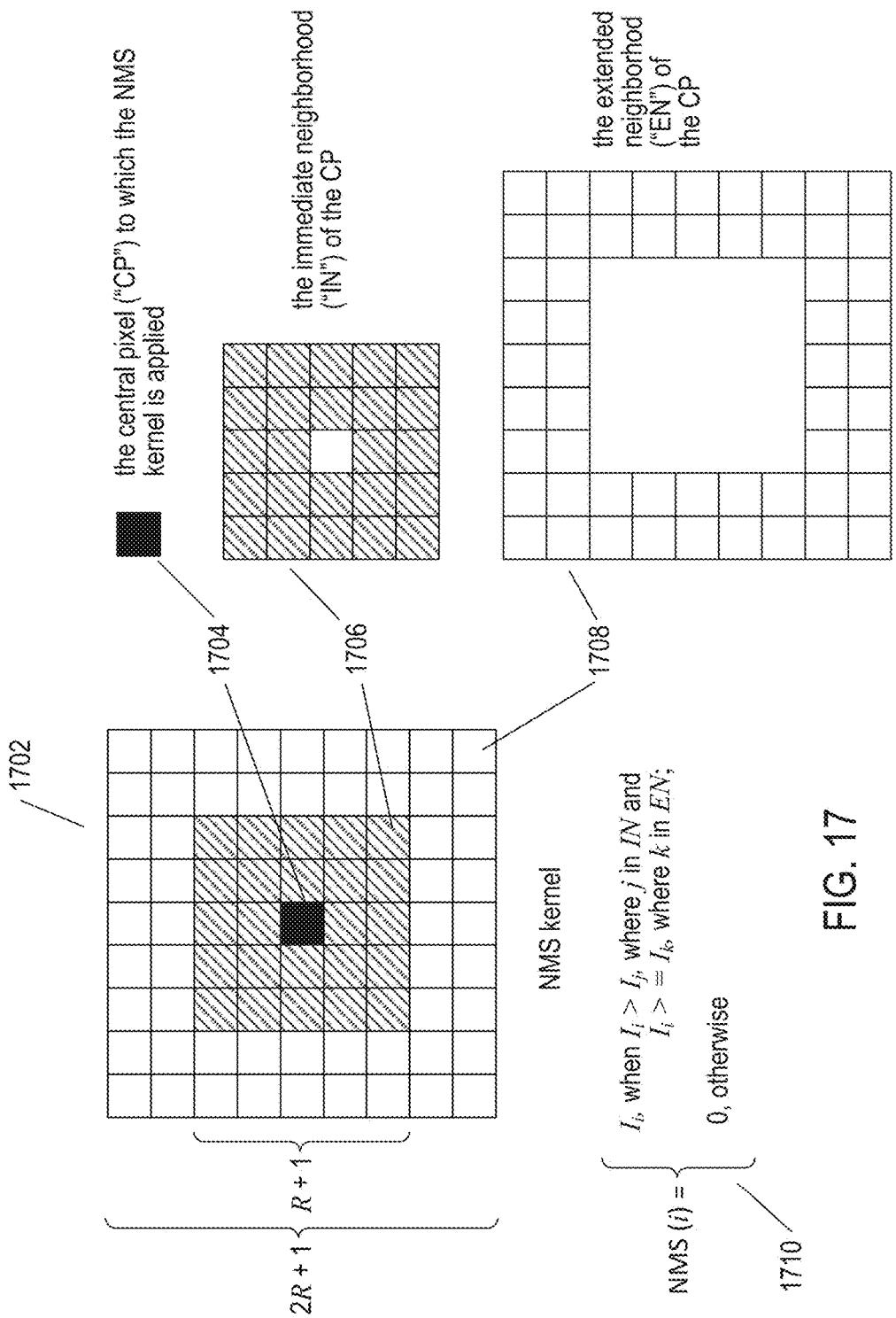
FIG. 17 illustrates a particular implementation of the currently disclosed methods and systems.

FIG. 17 illustrates a non-maximum-suppression kernel ("NMS kernel"). The NMS kernel 1702 includes three regions: (1) the central pixel 1704; (2) an immediate neighborhood 1706; and (3) an extended neighborhood 1708. Application of the NMS kernel to a pixel involves overlaying the NMS kernel so that the central-pixel region 1704 of the NMS kernel overlies the pixel to which the kernel is applied. Application of the kernel is used to decide whether or not the intensity of the pixel to which the kernel applied is transferred to the corresponding pixel or cell of the result image or map, or whether, instead, a 0 intensity value is transferred to the result map or image. When the intensity of the pixel underlying the central pixel of the NMS kernel is greater than the intensity of any pixel underlying the intermediate neighborhood of the NMS kernel and when the intensity of the pixel underlying the central-pixel region is greater or equal to the intensity of any pixel underlying the extended neighborhood of the NMS kernel, the intensity value of the central pixel is transferred to the resultant image or map. Otherwise, the value 0 is transferred to the resultant image or map. This decision process is formally expressed 1710 in FIG. 17. Convolution of the NMS kernel with an image or map selects pixels or cells of the image or map with local maximal intensities for transfer to the resultant map or image.

Figure 18:
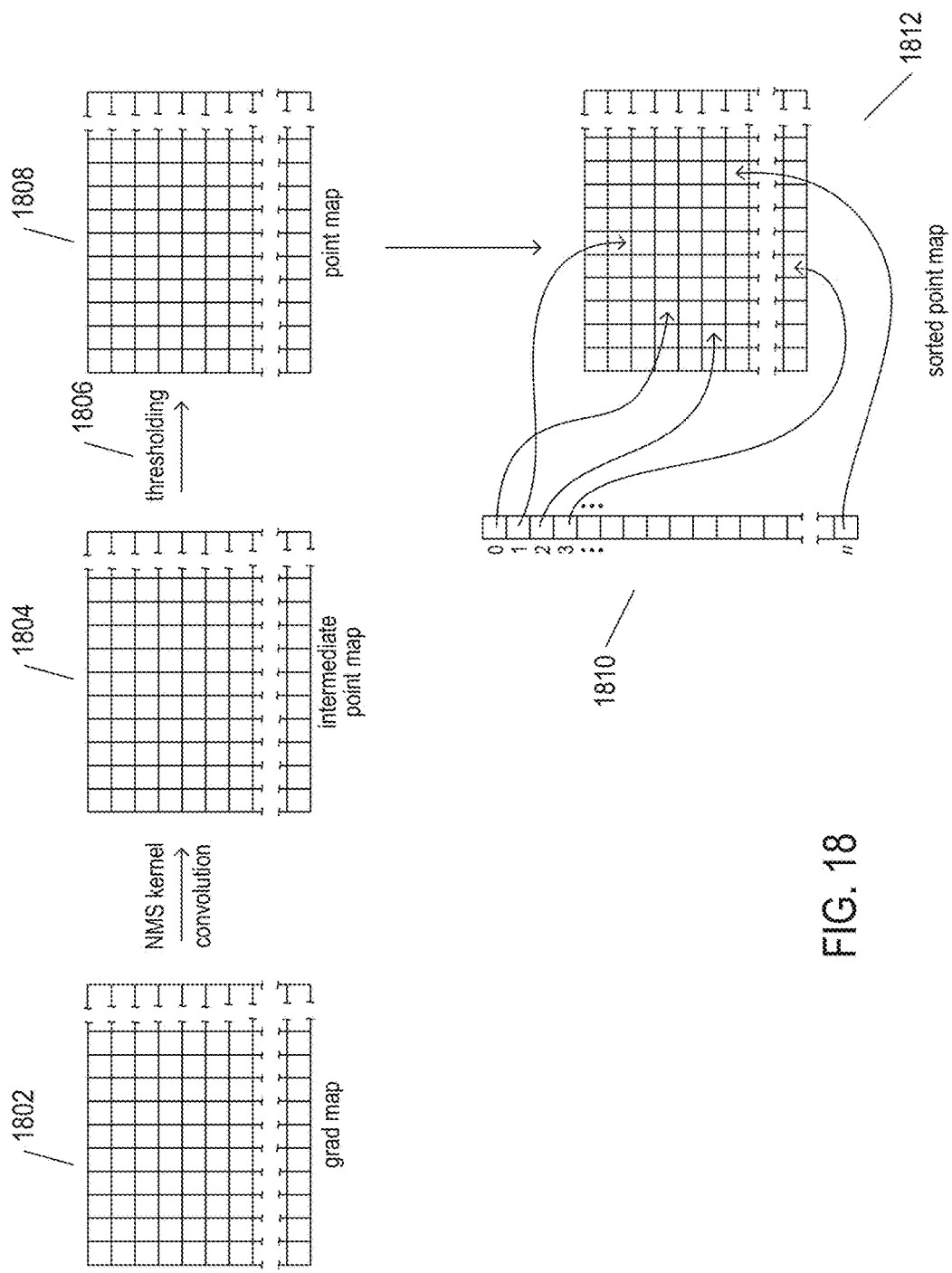
FIG. 18 illustrates a particular implementation of the currently disclosed methods and systems.

FIG. 18 illustrates additional steps in the contour-finding process that lead to generation of a point map that includes indications of the seed pixels from which contours are initiated, discussed above with reference to point map 1404 in FIG. 14. The grad map 1802, generated by the process discussed above with reference to FIG. 16, is convolved with an NMS kernel to produce an intermediate point map 1804. The NMS kernel considers the gradient-magnitude component of each grad-map cell, transferring the locally maximal gradient magnitudes from the grad map to the intermediate point map 1804. Next, thresholding 1806 is applied to the intermediate point map to produce a final point map 1808 containing the largest-valued gradient magnitudes, with all other cells containing the value 0 as a result of NMS-kernel convolution or thresholding. In certain implementations, an index 1810 is created to contain sorted references to the seed pixels in the point map to produce a sorted point map 1812. The index is sorted in descending gradient-magnitude order, so that the most promising seed pixels are processed with greater priority than less-promising seed pixels. Note that alternative implementations may use a sorted array of data structures, each containing the coordinates and the gradient magnitude for a seed pixel, rather than retaining a sparse point map. The seed pixels are generally pixels coincident with the most pronounced intensity edges in the digital image.

Figure 19:
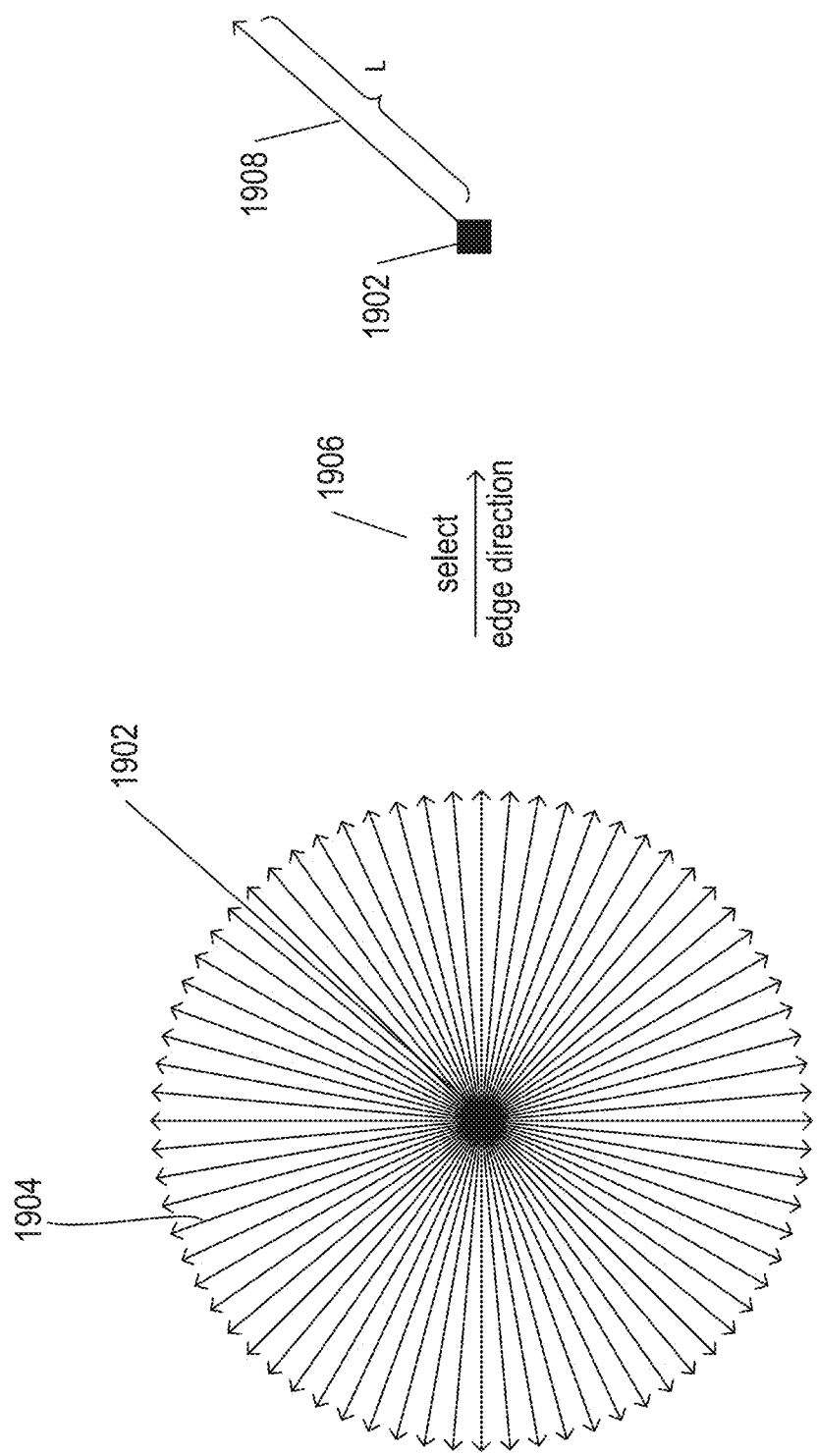
FIG. 19 illustrates a particular implementation of the currently disclosed methods and systems.

With a point map, sorted point map, or other seed-point-containing data structure in hand, the contour-finding process proceeds, as discussed above with reference to map or image 1408 in FIG. 14, to initiate contour construction from seed pixels or points. FIG. 19 illustrates the overall contour-initiation process. From a given seed pixel or point within the point map 1902, an initial contour may have one of many possible directions, indicated by arrows, such as arrow 1904. The initial edge-direction selection step 1906 selects a particular direction for the incipient contour and constructs a vector 1908 of length L with a tail coincident with the seed pixel 1902 and with a direction equal to the selected direction. The incipient contour is then a segment with two endpoints corresponding to the tail and head of the constructed vector. In the following discussion, the vectors may be alternatively referred to as "segments," since, as discussed below, a contour is represented by a series of head-to-tail vectors. These elements of a representation of a contour may be encoded either as vectors, with a starting point, magnitude, and orientation angle, or as segments, with coordinates for the starting and ending point of the segment.

Figure 20:
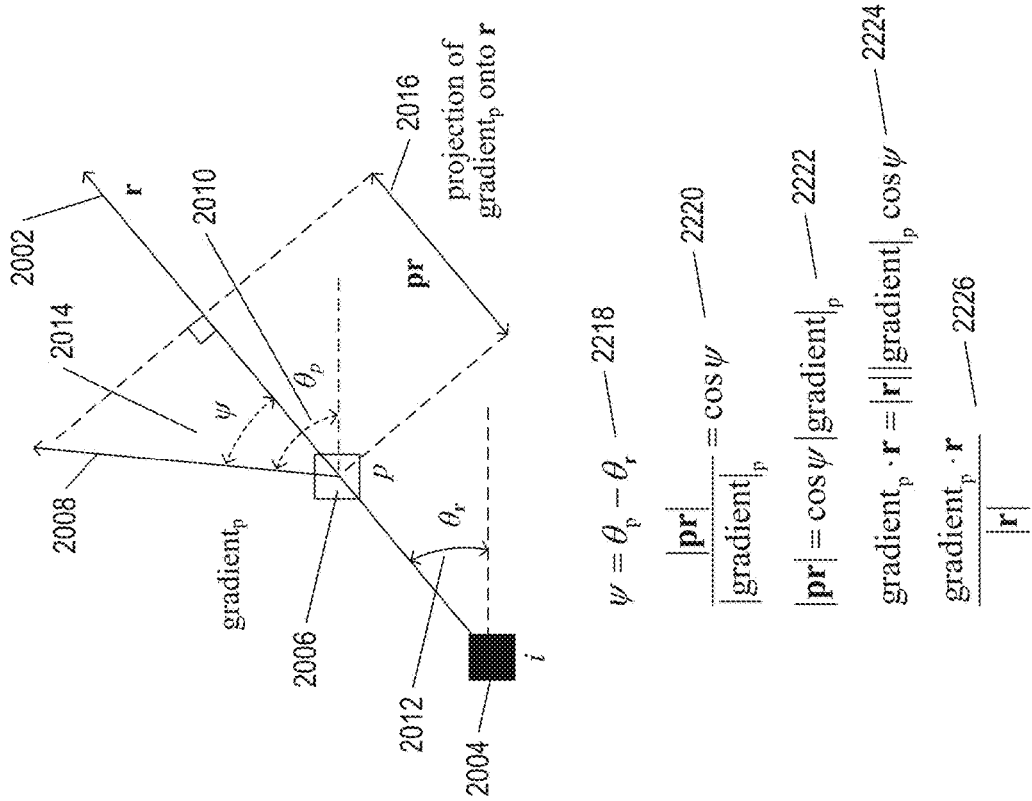
FIG. 20 illustrates a particular implementation of the currently disclosed methods and systems.

FIG. 20 illustrates computation of the magnitude of the projection of the gradient of a pixel p along an initial contour vector r emanating from a seed pixel or seed point i. As shown in FIG. 20, a proposed or candidate initial vector r 2002 for the contour coincident with a seed pixel i 2004 is considered during the process of selecting the direction for the incipient contour. Pixel p 2006 lies along vector r 2002. There is a gradient vector 2008 associated with pixel p in the grad map. This gradient vector has an orientation angle $\theta_p$ 2010, also available in the grad map. Angle 2012, $\theta_r$, is the orientation angle for vector r. The angle $\Psi$ 2014 is the angle between the gradient vector for pixel p and the vector r 2002. The vector pr 2016 is the projection of gradient vector 2008 onto vector r 2002. In the construction shown in FIG. 20, the angle $\Psi$ is easily computed 2218 from orientation angles $\theta_p$ and $\theta_r$. The ratio of the magnitudes of the vectors pr and the gradient vector for pixel p is equal to the cosine of angle $\Psi$ 2220. Thus, the magnitude of the projection vector pr is obtained as the product of the cosine of $\Psi$ and the magnitude of the gradient vector emanating from pixel p 2222. Alternatively, the dot product of the gradient vector 2002 and the vector r can be used to compute the magnitude of the projection vector pr 2224. Substituting the result 2222 into the dot-product expression produces an expression for the magnitude of the projection vector pr 2226. Similar constructions can be generated for all possible relative positions of the gradient vector for pixel p and the initial contour vector r.

Figure 21:
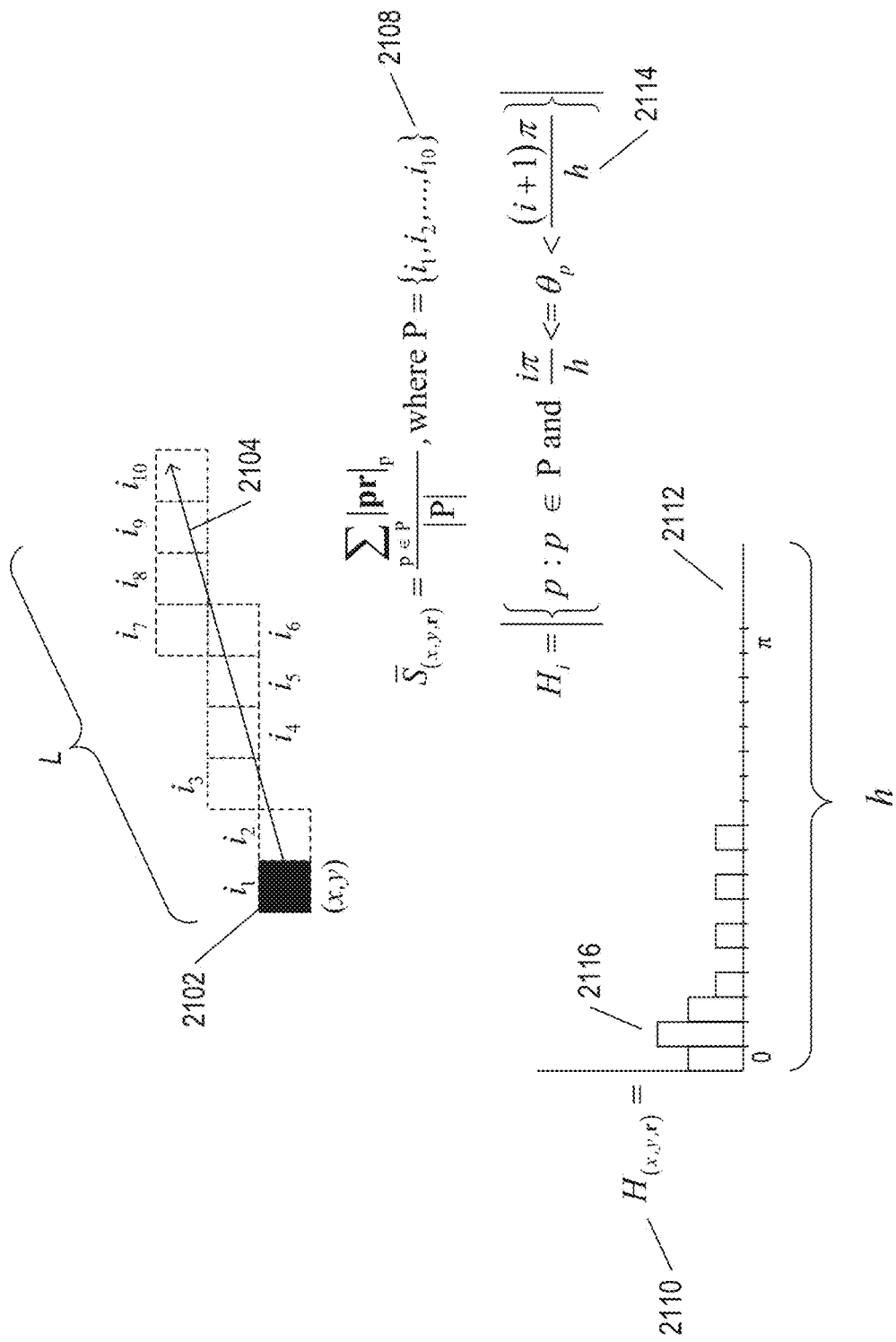
FIG. 21 illustrates a particular implementation of the currently disclosed methods and systems.

FIG. 21 illustrates generation of intermediate computed values used for the edge-direction-selection process for seed pixels. In FIG. 21, a seed pixel with coordinates (x,y) 2102 is shown along with a candidate incipient-contour vector 2104. Two intermediate results, $\overline{S}_{(x,y,r)}$ 2108 and $H_{(x,y,r)}$ 2110 are generated for the candidate edge vector, where r is vector 2104 and is also referred to as the direction of the incipient edge, in which case the references is actually made to the orientation angle of the vector r. There are 10 pixels, including seed pixel 2102, that underlie the vector 2104 representing the candidate incipient contour. The value $\overline{S}_{(x,y,r)}$ is computed as the sum of the magnitudes of the projections of the vector associated with pixels $i_1$–$i_{10}$ divided by the cardinality of the set of pixels underlying the incipient contour. $H_{(x,y,r)}$ is a histogram 2112 in which the gradient orientations of the pixels underlying the incipient-contour vector are tabulated in histogram bins. As shown by expression 2114, the number of pixels recorded in each bin $H_i$ of the histogram corresponds to the number of pixels with gradient orientations within the range of orientations represented by the bin. The maximally valued bin 2116 generally corresponds to the overall gradient direction of the pixels underlying the incipient contour. When incipient contour is correctly oriented, the direction of the vector 2104 should be generally perpendicular to the gradient directions of the pixels underlying vector 2104.

Figure 22:
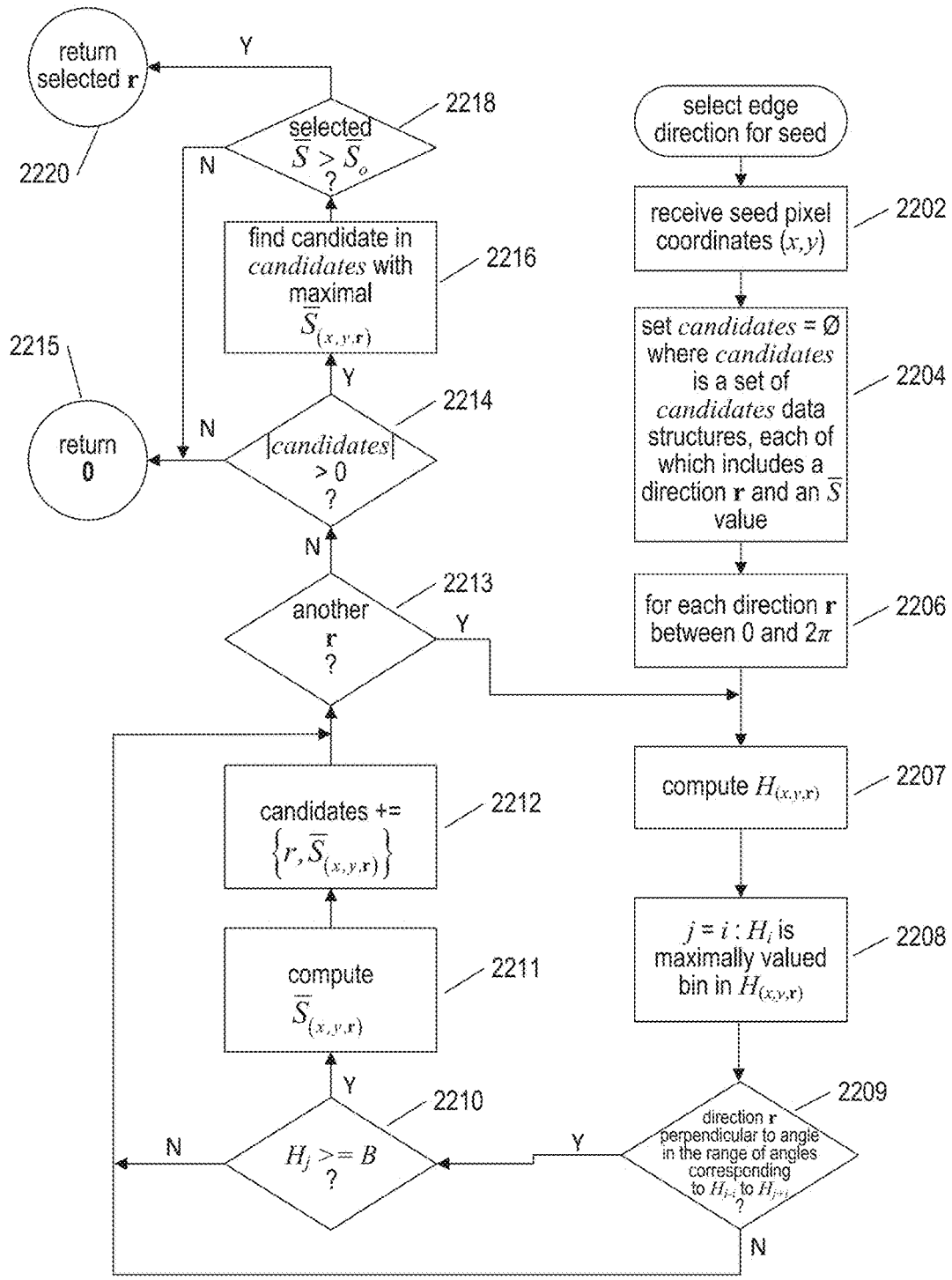
FIG. 22 illustrates a particular implementation of the currently disclosed methods and systems.

FIG. 22 provides a control-flow diagram for the edge-direction-selection process that selects an incipient contour direction for a seed pixel. In step 2202, the process receives the coordinates for the seed pixel. In step 2204, a candidate set is initialized to the empty set. The candidate set is a set of candidate data structures, each of which includes a direction r and an $\overline{S}$ value. In the for-loop of steps 2206-2213, each of a number of directions r between 0° and 360° is considered. Again, note that r is both considered to be a vector and a direction in the current discussion, where the direction is the orientation direction of vector r. In step 2207, the histogram $H_{(x,y,r)}$ is computed for the currently considered direction. The index j is set, in step 2208, to the index of the maximally valued bin in $H_{(x,y,r)}$. In step 2209, determination is made as to whether the direction r is perpendicular to an angle within the range of angles corresponding to the maximum valued bin and its adjacent neighbors. When the direction r is perpendicular to an angle in this range, then, in step 2210, a determination is made as to whether the value of, or number of pixels assigned to, the maximally valued bin is greater than a threshold value B. When this is the case, then, in step 2211, the value $\overline{S}_{(x,y,r)}$ is computed for the currently considered direction and, in step 2212, an entry for the currently considered direction is added to the set candidates. Upon completion of the for-loop of steps 2206-2213, when the cardinality of the set candidates is less than 0, as determined in step 2214, the 0 vector is returned, in step 2215, to indicate that no preferred contour direction can be determined for the seed pixel. Otherwise, in step 2216, the member of the set candidates with the greatest $\overline{S}_{(x,y,r)}$ value is selected. When the S value for the selected candidate is greater than a threshold value $\overline{S}_0$, as determined in step 2218, the direction r contained in the selected candidate is returned in step 2220. Otherwise, the 0 vector is returned, in step 2215 to indicate that no direction can be determined for the seed pixel. Thus, selection of an initial contour direction for a seed pixel involves selecting a direction that agrees with the directions of the gradient vectors of pixels in the neighborhood of the initial contour, when there is a consensus within the neighborhood with regard to the gradient direction.

It should be noted that, in certain cases, there will be no single maximally valued histogram bin. In general, in such cases, the method will fail due to thresholding based on threshold value B. In other cases, when there are multiple, non-adjacent maximally valued histogram bins, additional information may be considered to either select one of the maximally values bins as representative of the gradient direction for the neighborhood or to fail the direction determination by returning the 0 vector.

Figure 23:
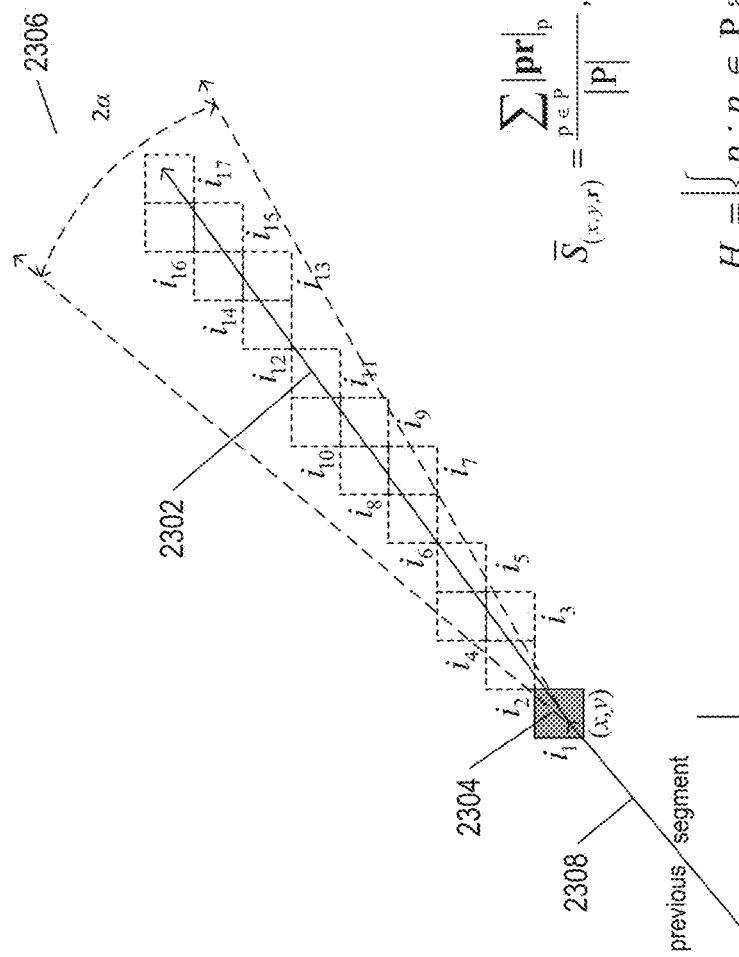
FIG. 23 illustrates a particular implementation of the currently disclosed methods and systems.
Figure 24:
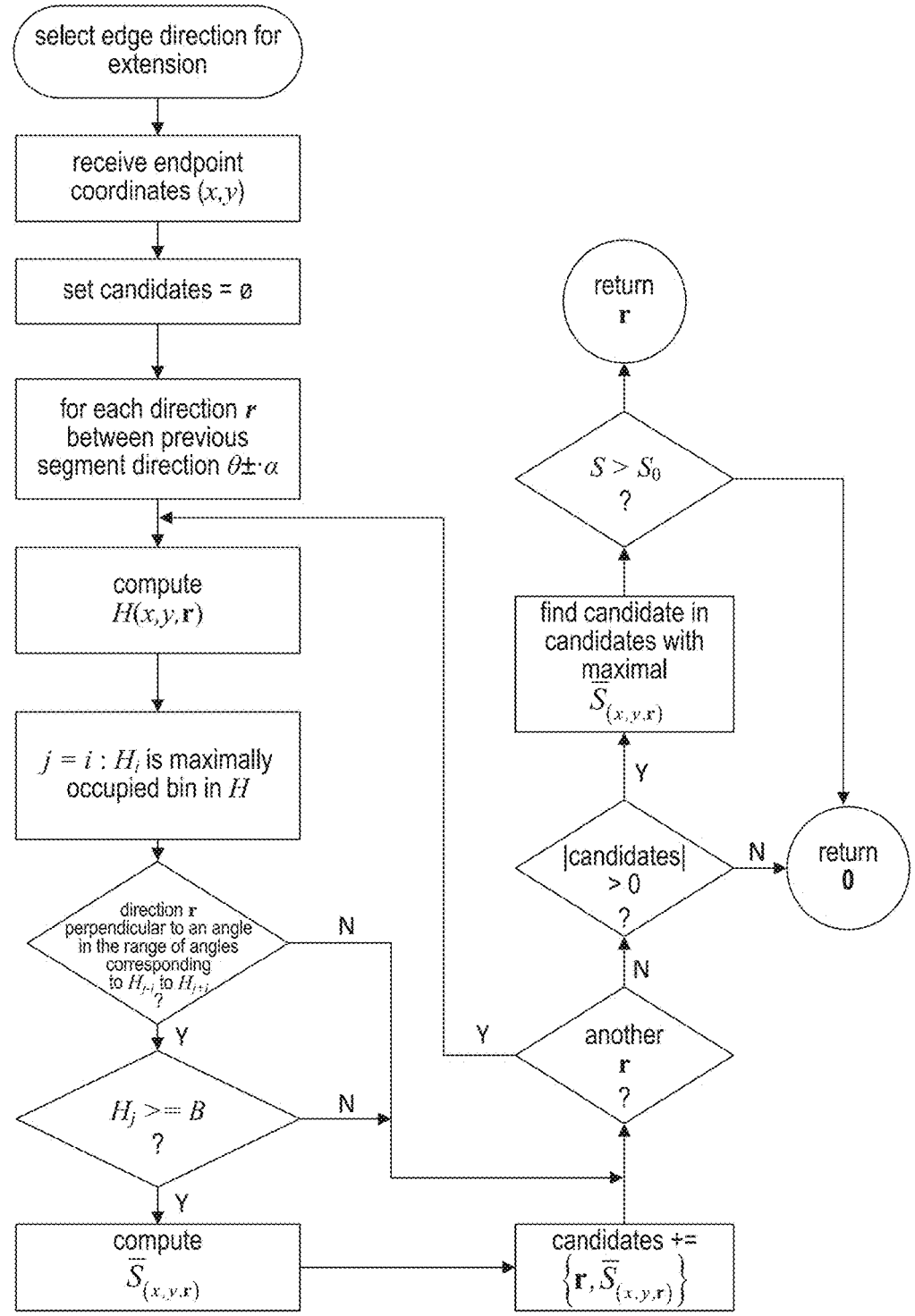
FIG. 24 illustrates a particular implementation of the currently disclosed methods and systems.

FIGS. 23 and 24 illustrate selection of a direction for an extension of a contour. The contour-extension-direction selection process is quite similar to the process for selecting initial contour directions for seed pixels, discussed above with reference to FIGS. 20-22. However, in the contour-extension process, a next vector of length L is extended from the endpoint pixel of a contour under construction rather than constructing two vectors extending from a seed pixel in two opposite directions. In FIG. 23, a next candidate vector 2302 is shown extended from the endpoint pixel 2304 of a contour under construction. In this case, only directions within an angle 2α2306 are considered as candidate directions. In other words, the next segment for the contour 2302 can be inclined with respect to the direction of the previous, already existing segment of the contour 2308 by up to an angle α. Otherwise, the direction-selection process is similar to that for selecting the direction of the initial vectors corresponding to an incipient contour for a seed pixel.

Figure 25:
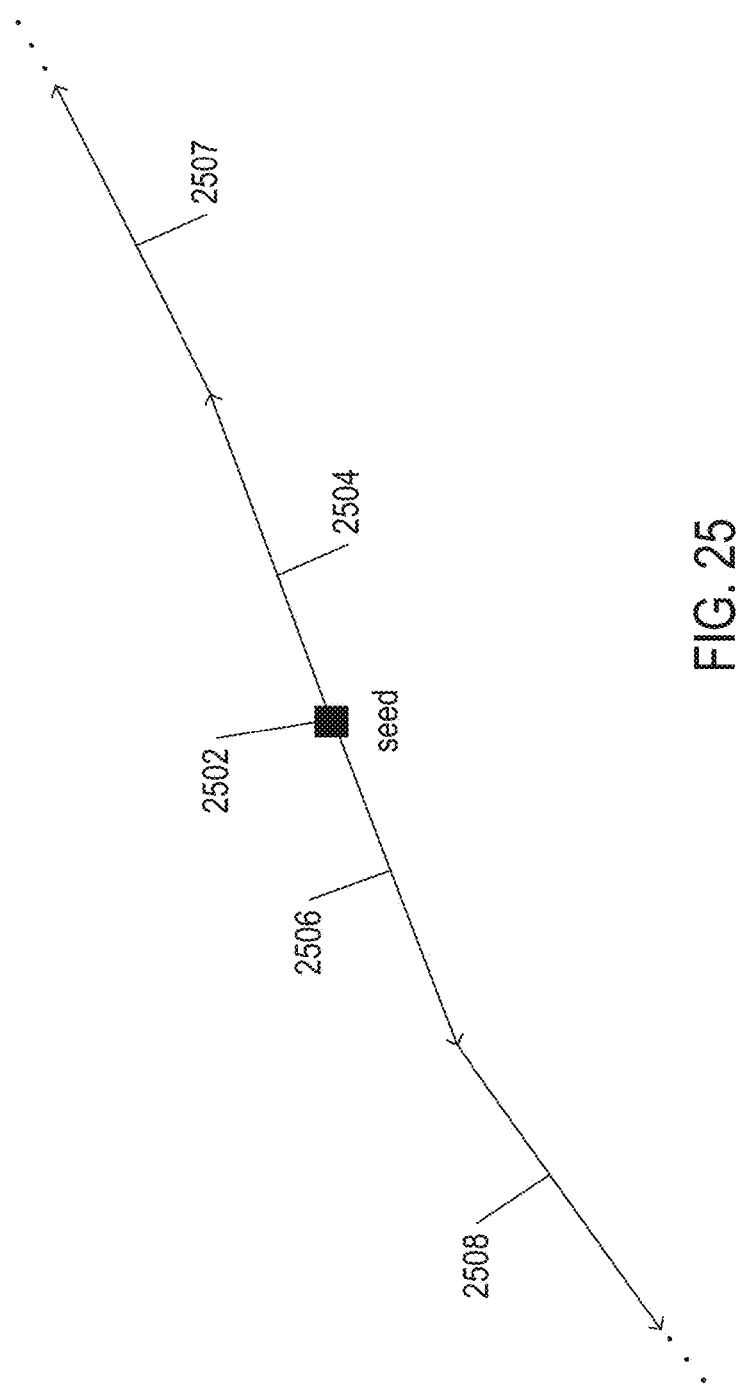
FIG. 25 illustrates a particular implementation of the currently disclosed methods and systems.

FIG. 25 illustrates the contour-construction process. The process starts with a seed pixel 2502. An initial vector 2504 is constructed to form an incipient contour with a direction selected as discussed above with reference to FIGS. 20-22. Then, the incipient contour is extended in each direction by successively adding extension vectors, such as vectors 2506-2508, to each end of the contour. When a direction for a next extension from a particular contour endpoint cannot be determined, then extension of the contour in that direction is terminated with the endpoint.

Figure 26:
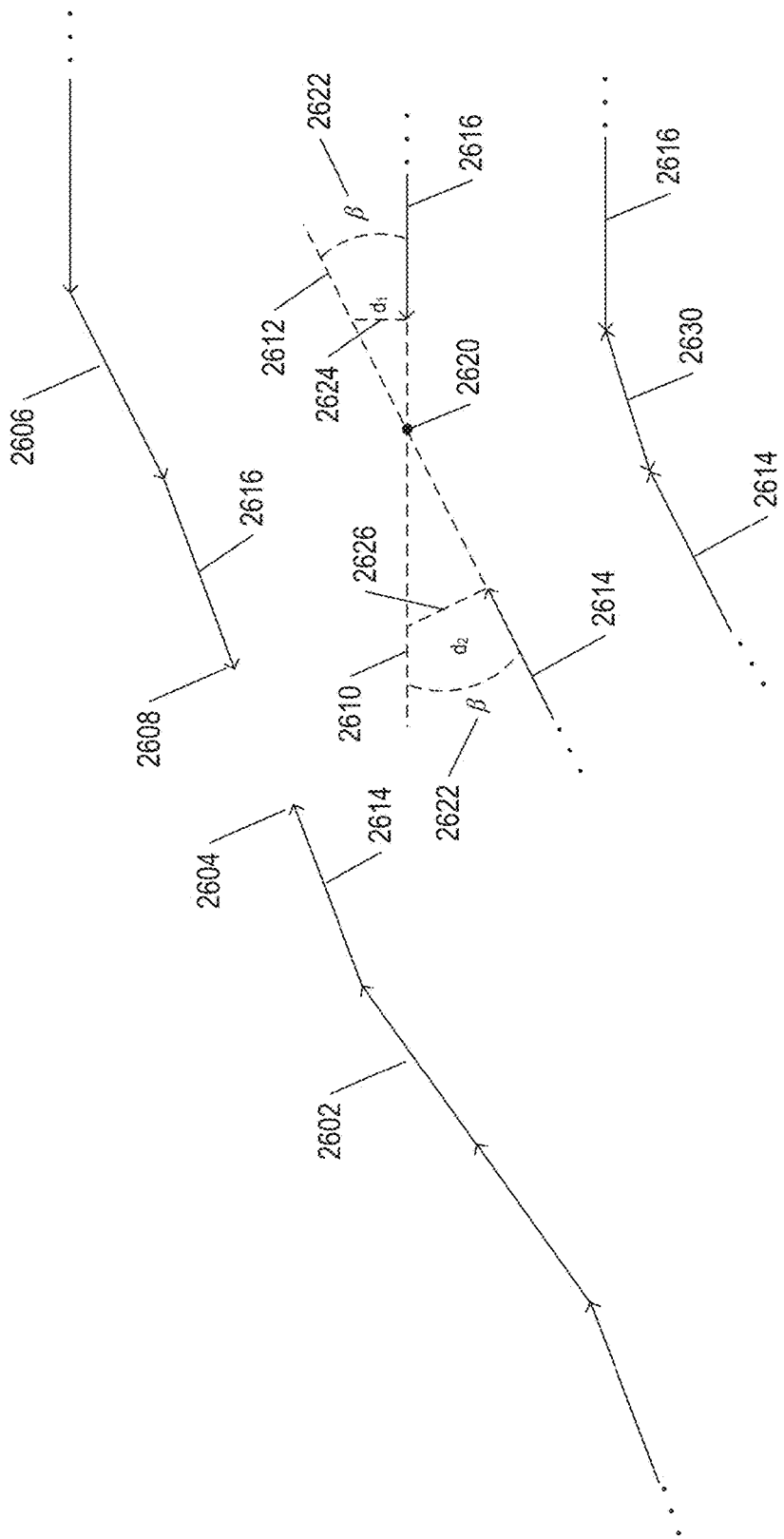
FIG. 26 illustrates a particular implementation of the currently disclosed methods and systems.

FIG. 26 illustrates the joining of two contours to form a single, result contour. In FIG. 26, a first multi-segment contour 2602 terminates at endpoint 2604 and a second multi-segment contour 2606 terminates at endpoint 2608. The first and second contours 2602 and 2606 may represent two discrete and distinct intensity edges within an image or may represent two portions of a single intensity edge with a gap separating the two portions. In the latter case, the two portions are joined to produce a single, continuous contour. In the joining process, the two contours are extended from their respective endpoints, as indicated by dashed vectors 2610 and 2612 extending from the final segments 2614 and 2616 of the first 2602 and second 2606 contours. The direction of the extension may be either the direction of the final segment of each contour that includes one of the two endpoints, or may be determined using an approximation method based on the directions of the final n segments in each contour. Many different approximation methods can be used, including linear-regression methods when the final portion of the contours appear to be linear and quadratic or cubic approximations when the final portions of the contours appear to be curved. The extensions in the example of FIG. 26 intersect at a point 2620. The angle of the intersection, β 2622, and the perpendicular distances $d_1$ 2624 and $d_2$ 2626 are computed in order to determine whether or not to join the two contours. When the angle β does not exceed a threshold angle and when the minimum of the two distances $d_1$ and $d_2$ does not exceed a maximum threshold distance, then a bridging segment 2630 is constructed to join the two contours to produce a single, result contour.

Control-flow Diagrams

The current subsection discusses a series of control-flow diagrams that illustrate one implementation of the currently disclosed methods and systems. These control-flow diagrams are based, in part, on the previously discussed FIGS. 13-26, which illustrate many of the processes and sub-processes involved in contour identification.

FIGS. 27A-G illustrate, using control-flow diagrams and data-structure representations, one implementation of the currently disclosed method for finding contours in digital images, used in a variety of different devices, appliances, and computational systems as an initial step in various types of automated digital-image-based processes.

Figure 27A:
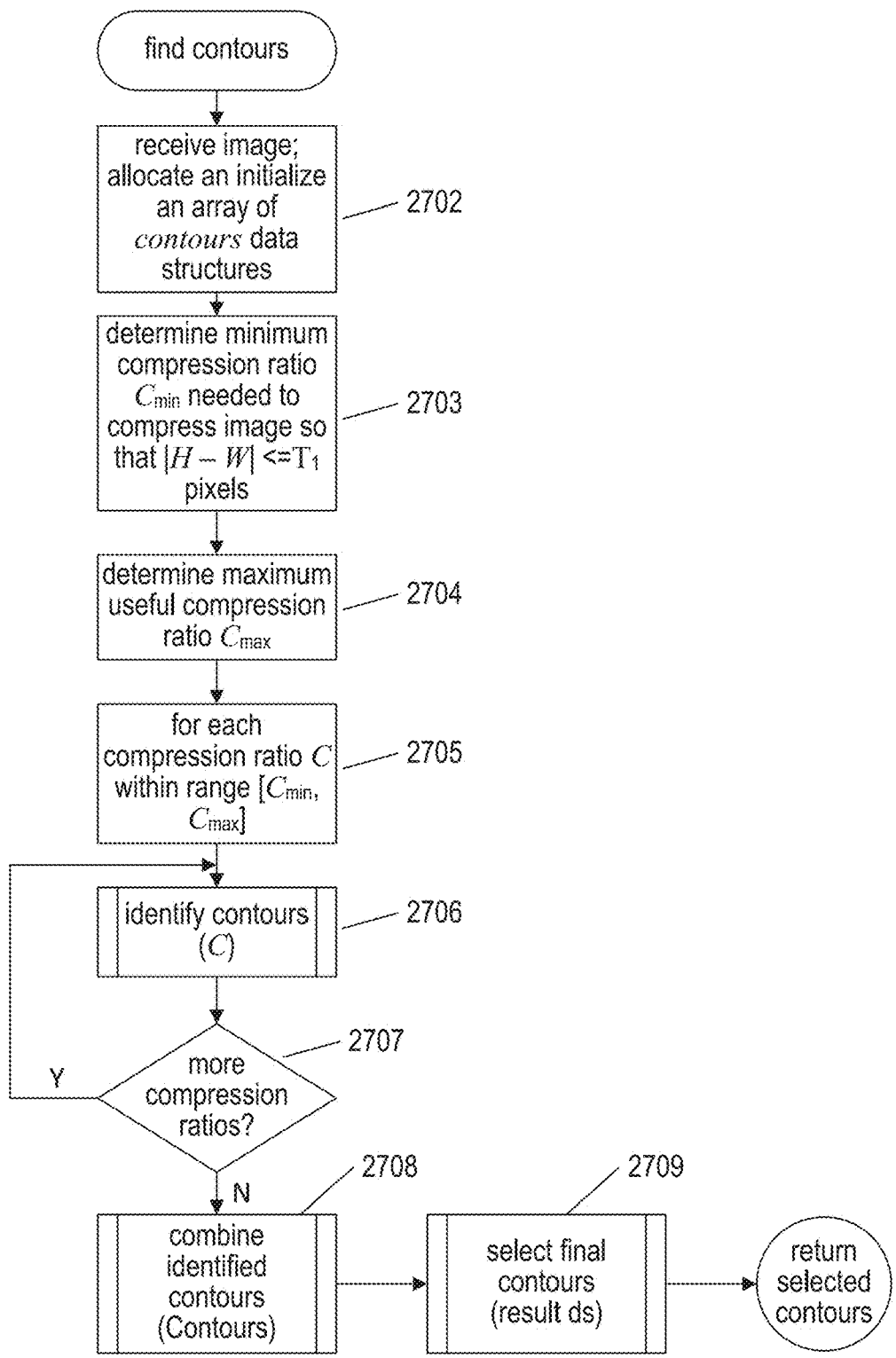
FIG. 27A illustrates, using control-flow diagrams and data-structure representations, one implementation of the currently disclosed method for finding contours in digital images, used in a variety of different devices, appliances, and computational systems as an initial step in various types of automated digital-image-based processes.

FIG. 27A provides a control-flow diagram for a routine "find contours," which represents one implementation of the currently disclosed method for identifying contours in a digital image. In step 2702, the digital image is received and an array contours of contour data structures is allocated and initialized. In step 2703, a minimum compression ration $C_{min}$ needed to compress the received image so that the difference between the height and width of the compressed image is less than a threshold number of pixels is determined. In step 2704, a maximum useful compression ration $C_{max}$ is determined. In the for-loop of steps 2705-2707, the routine "identify contours" is iteratively called to compress the original image by a compression ratio in the range $[C_{min}, C_{max}]$ and identify contours within the compressed image. The number of compressed images generated by the for-loop may depend on a parameterized iteration compression-ratio interval, on the dimensions of the received digital image, and other factors. In certain cases, only a single compressed image is generated. In other cases, contours are identified in the original image, without compression, when the disparity in dimensions in the original image is less than the threshold number of pixels. In step 2708, the routine "combine identified contours" is called to combine the contours identified in the for-loop of steps 2705-2707. In step 2709, the routine "select final contours" is called in order to select a final set of contours as the identified contours for use in subsequent digital-image-processing processes.

Figure 27B:
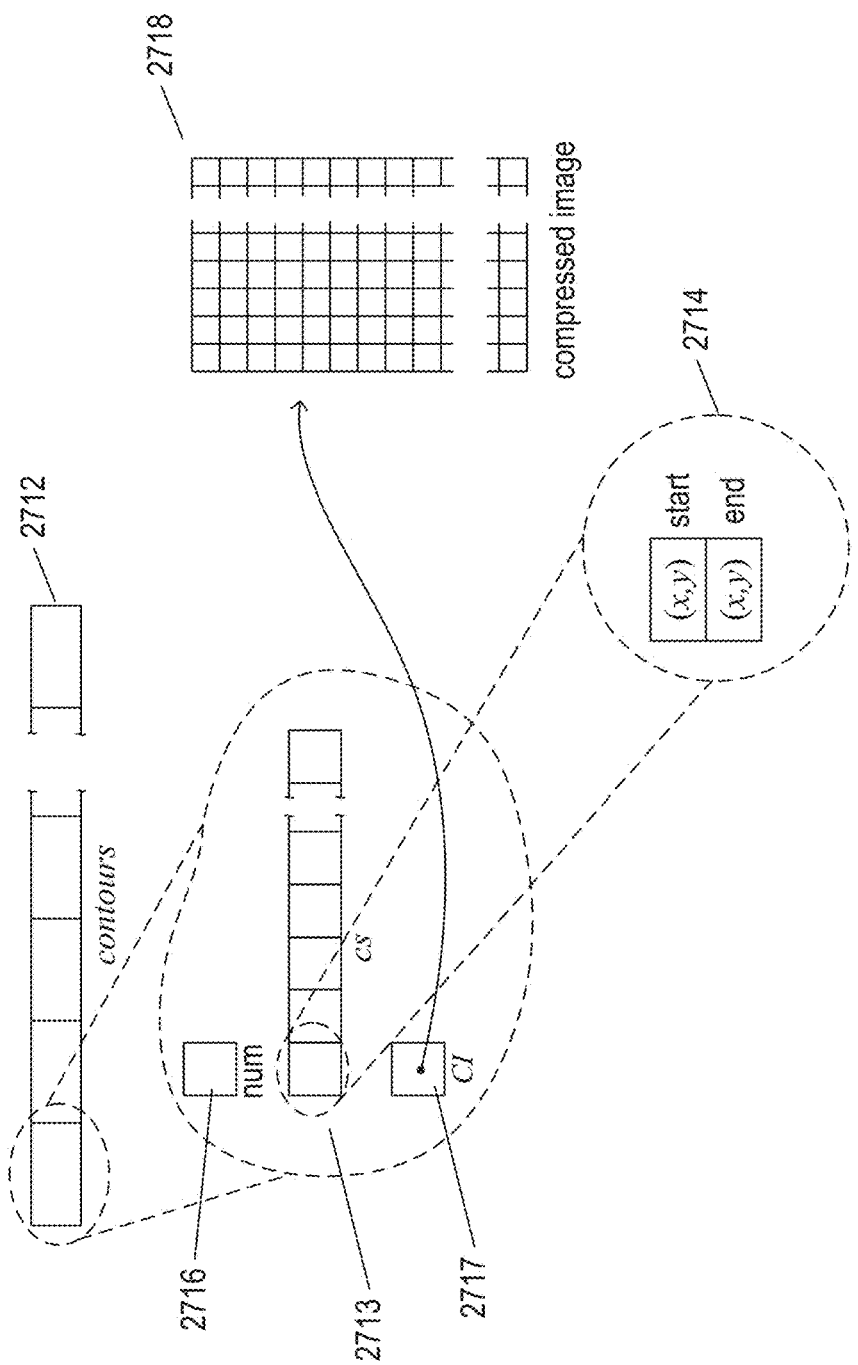
FIG. 27B illustrates, using control-flow diagrams and data-structure representations, one implementation of the currently disclosed method for finding contours in digital images, used in a variety of different devices, appliances, and computational systems as an initial step in various types of automated digital-image-based processes.

FIG. 27B shows a data structure used in the described implementation. The contours data structure 2712 is an array of contour data structures that each includes an array cs 2713 that stores the starting point and ending point 2714 for individual contours identified within a particular compressed image or, in certain cases, the original image. In addition, the contour data structure includes an indication of the number of found contours 2716 and a reference 2717 to the compressed image or, in certain cases, original image 2718 in which the contours are identified. This is, of course, merely one possible data structure used in one possible method to represent the contours identified in one or more digital images.

Figure 27C:
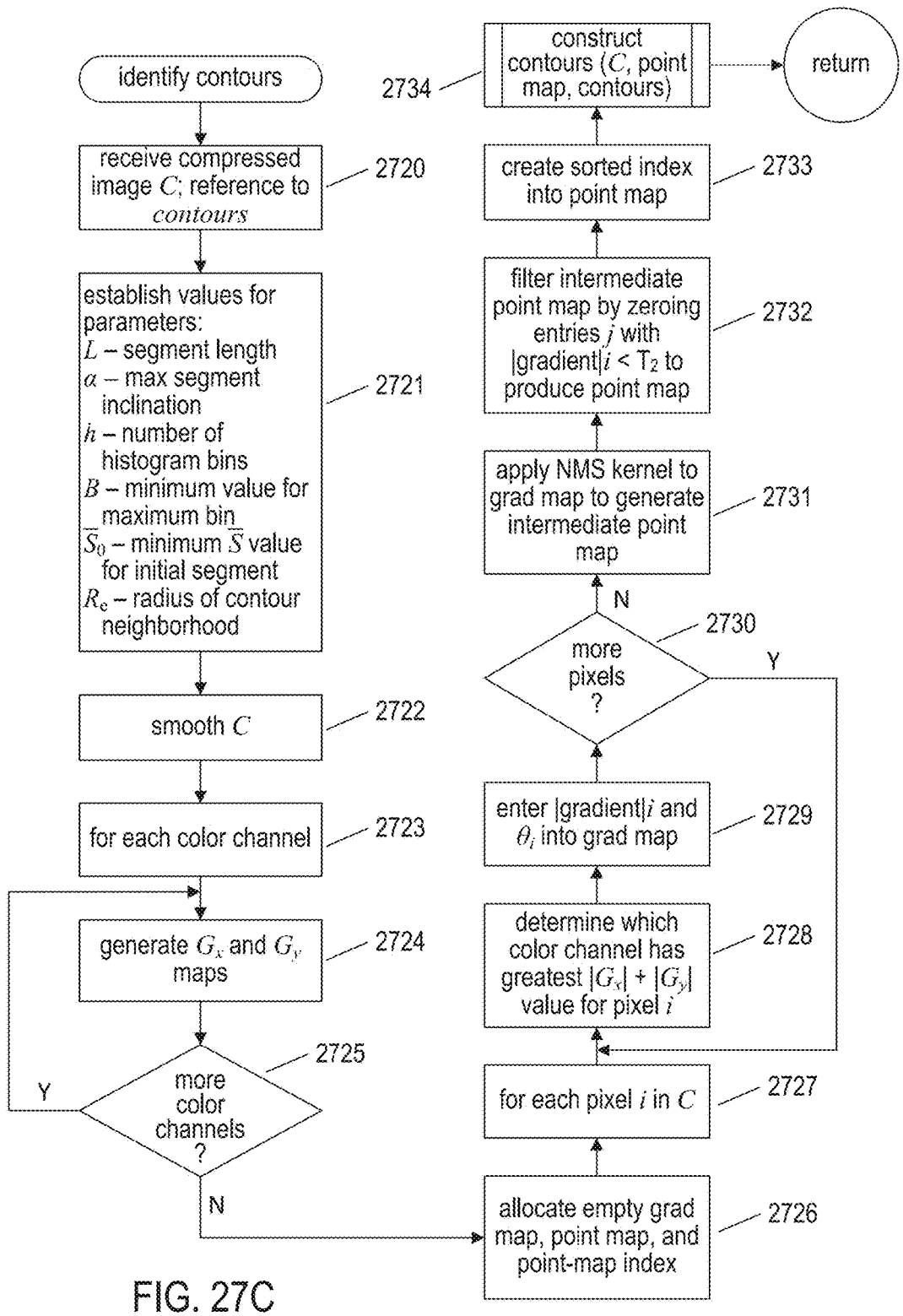
FIG. 27C illustrates, using control-flow diagrams and data-structure representations, one implementation of the currently disclosed method for finding contours in digital images, used in a variety of different devices, appliances, and computational systems as an initial step in various types of automated digital-image-based processes.

FIG. 27C provides a control-flow diagram for the routine "identify contours," called in step 2706 of FIG. 27A. In step 2720, an image, generally a compressed image C, is received and a reference to the data structure contours is received. In step 2721, values are established for a number of parameters that control contour identification. These include: (1) L, the length of segments used to construct contours; (2) α, the maximum inclination of a next extension segment from the direction of the current, final segment in a contour; (3) h, the number of histogram bins for the histograms $H_{(x,y,r)}$; (4) B, the minimum value for the maximum valued bin of a histogram; (5) $\overline{S}_0$, the minimum $\overline{S}$ value for an initial segment; and (6) $R_e$, the radius of a contour neighborhood. These values may be hard coded, obtained from a configuration file, or specified through a user interface.

In step 2722, the received image C is smoothed, as discussed above with reference to step 1604 in FIG. 16. In the for-loop of steps 2723-2725, gradient-component maps for each of three color channels in the compressed image C are generated, as discussed above with reference to FIG. 16. In step 2726, a grad map and point map with index are allocated (1802 and 1812 in FIG. 18). In the for-loop of steps 2727-2730, a grad-map entry is entered into the grad map for each pixel i in the image C, as discussed above with reference to FIG. 16. In step 2731, an NMS kernel is applied to the grad map to generate an intermediate point map (1804 in FIG. 18). In step 2732, the intermediate point map is filtered to zero entries j for which the gradient magnitudes are less than a threshold value (1806 in FIG. 18). In step 2733, a sorted index into the point map (1810 in FIG. 18) is created. Finally, in step 2734, the routine "construct contours" is called to construct contours coincident with certain of the seed pixels indicated by the point map generated in steps 2731-2733.

Figure 27D:
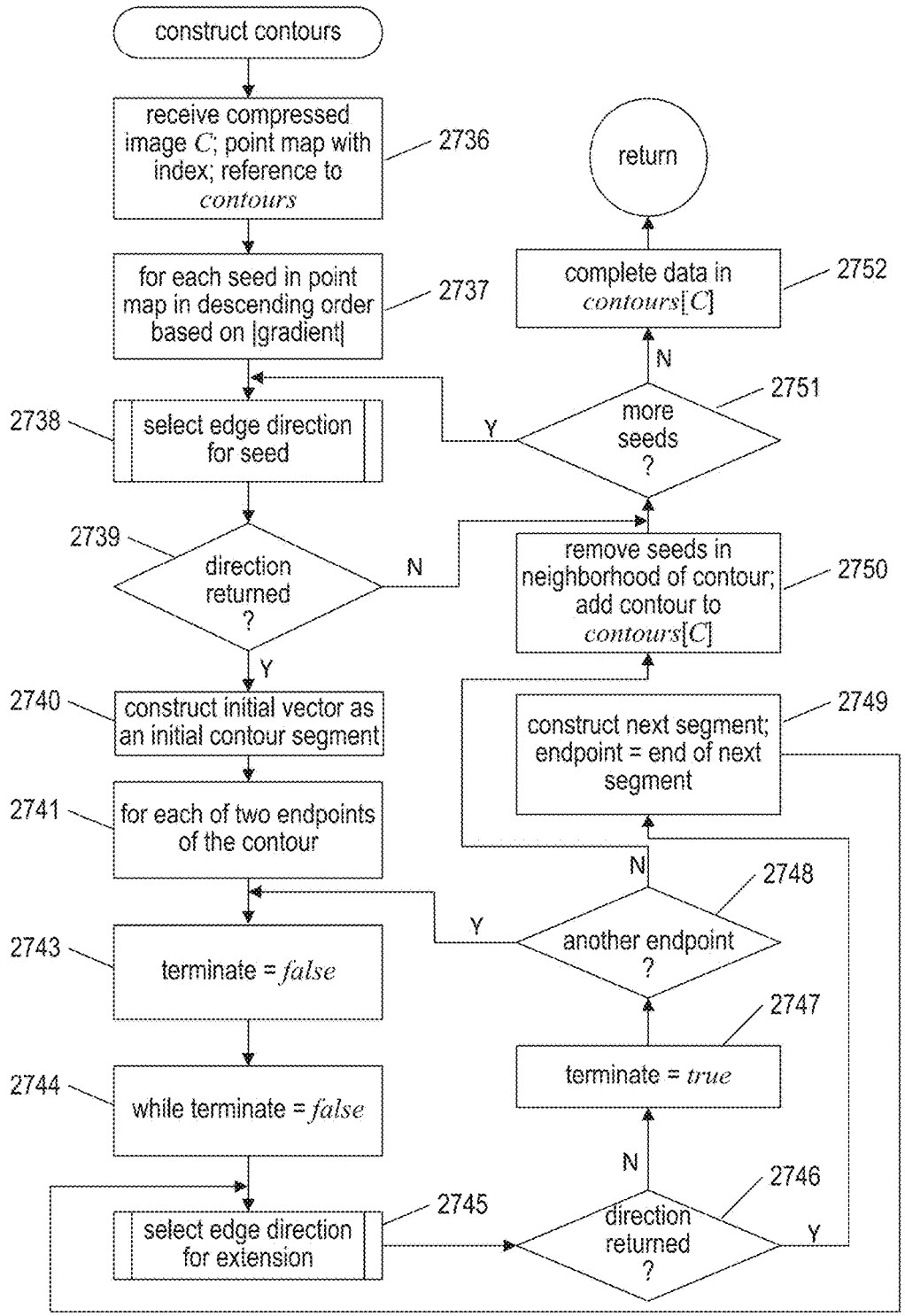
FIG. 27D illustrates, using control-flow diagrams and data-structure representations, one implementation of the currently disclosed method for finding contours in digital images, used in a variety of different devices, appliances, and computational systems as an initial step in various types of automated digital-image-based processes.

FIG. 27D provides a control-flow diagram for the routine "construct contours," called in step 2734 of FIG. 27C. In step 2736, the routine receives a compressed image C, a point map with index, and a reference to the contours data structure. In the for-loop of steps 2737-2751, each seed in the point map is considered in descending order based on gradient magnitude, by descending through the index associated with the point map. In step 2738, the routine "select edge direction for seed" is called to determine the direction for the incipient contour comprising the vector constructed to be coincident with the seed. Note that the routine "select edge direction for seed" is discussed above with reference to FIG. 22. When a direction is not returned, the current iteration of the for-loop of steps 2737-2751 ends and a next seed is considered. Otherwise, in step 2740, an initial vector is constructed from the seed according to the determined direction, as discussed above with reference to FIG. 19. In the inner for-loop of steps 2741-2749, the initial contour is extended, in both directions, via calls to the routine "select edge direction for extension" in step 2745. This routine is discussed above with reference to FIG. 24 and the overall process of contour construction is discussed above with reference to FIG. 25. Once a contour has been completed, any seeds in the neighborhood of the contour, defined by the radius $R_e$, are removed from the point map and index to avoid initiating new contours too close to the current identified contour. Finally, after completion of the outer for-loop of steps 2737-2751, the contour data structure in the array contours is completed in step 2752.

Figure 27E:
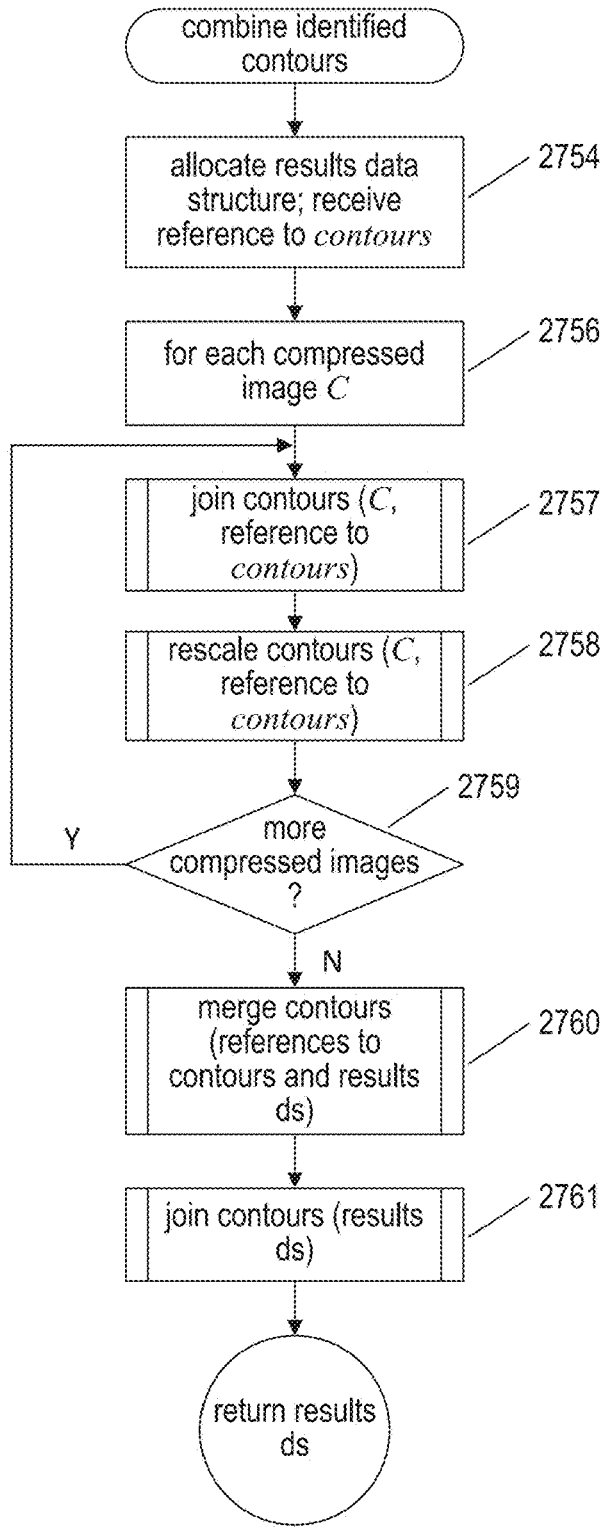
FIG. 27E illustrates, using control-flow diagrams and data-structure representations, one implementation of the currently disclosed method for finding contours in digital images, used in a variety of different devices, appliances, and computational systems as an initial step in various types of automated digital-image-based processes.

FIG. 27E provides a control-flow diagram for the routine "combine identified contours," called in step 2708 of FIG. 27A. In step 2754, a results data structure is allocated and a reference to the contours data structure is received. In the for-loop of steps 2756-2759, each contour data structure in the contours data structure is considered. Each contour data structure in the contours data structure corresponds to a particular compressed image or, in certain cases, the original image. In step 2757, the routine "join contours" is called to join together any portions of a longer contour separated by a gap, as discussed above with reference to FIG. 26, and the contours identified for the currently considered compressed image. In step 2758, the routine "rescale contours" is called to rescale the contours found in a compressed image back to the scale of the original image. In step 2760, the routine "merge contours" is called to merge together all of the contours found in all of the compressed images and, in step 2761, the merged contours, transferred to the results data structure, are joined by a call to the routine "join contours." Note that the routine "join contours" is assumed to be polymorphic, accepting either a reference to the contours data structure and a compressed-image index, as in the call in step 2757, or a single argument that references the results data structure.

Figure 27F:
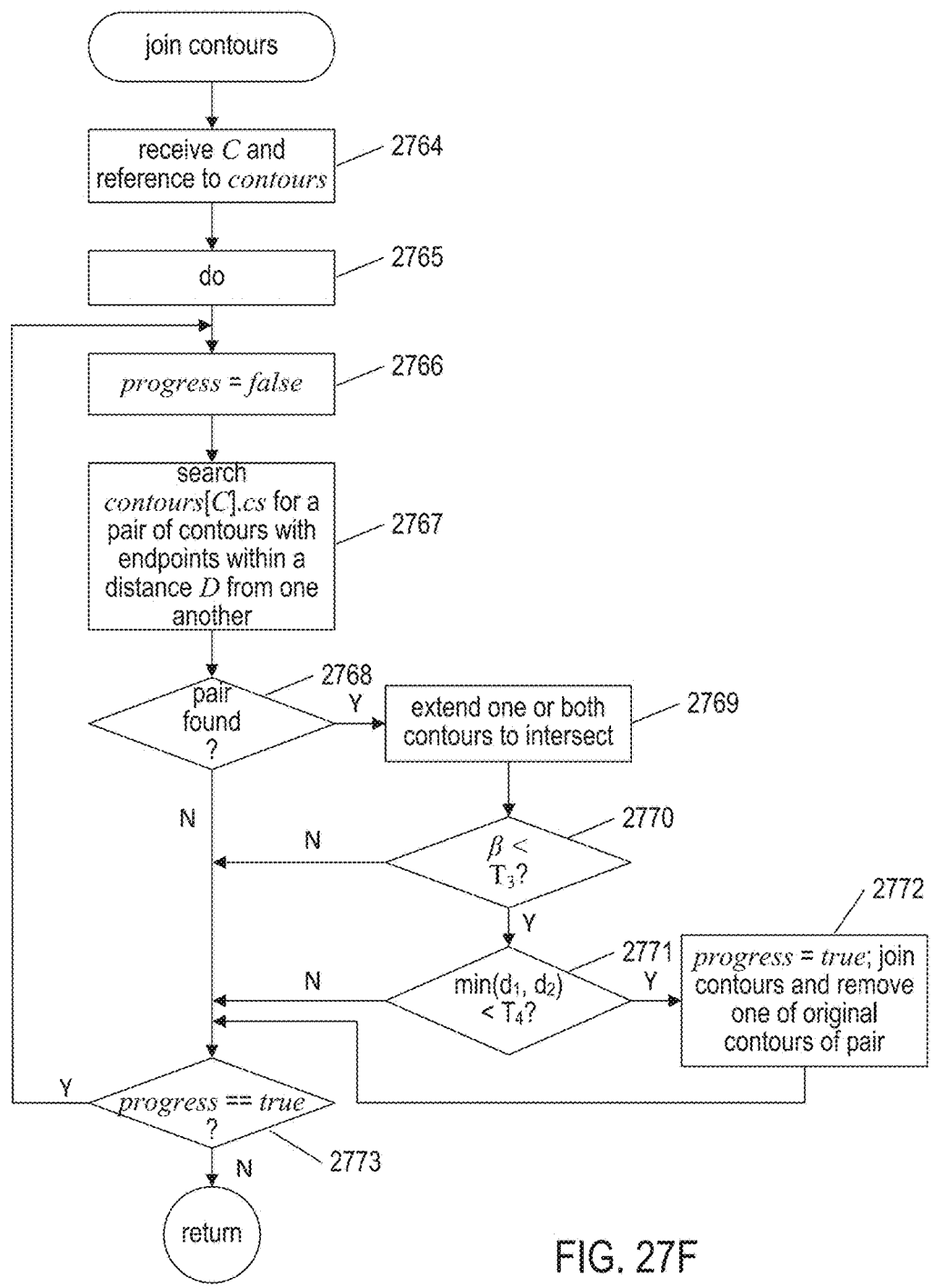
FIG. 27F illustrates, using control-flow diagrams and data-structure representations, one implementation of the currently disclosed method for finding contours in digital images, used in a variety of different devices, appliances, and computational systems as an initial step in various types of automated digital-image-based processes.

FIG. 27F provides a control-flow diagram for the routine "join contours" called in step 2757 of FIG. 27. In step 2764, the routine receives an indication of a compressed image C that is used as an index into the contours data structure, a reference to which is also received. In the do-while loop of steps 2765-2773, pairs of contours identified in the compressed image C are joined. In step 2766, a local variable progress is set to false. In step 2767, the identified contours are searched for a pair of contours with endpoints within a distance D from one another. Note that D may be parameterized, in certain implementations. When a next pair is found, as determined in step 2768, then, in steps 2769-2771, the considerations with respect to the endpoints and extensions of the two contours discussed above with reference to FIG. 26 are made to determine whether or not to join the two contours. When it is determined that the two contours are to be joined, then, in step 2772, the local variable progress is set to true, the two contours are joined, as discussed above with reference to FIG. 26. One of the original contours of the pair is removed and the other is modified to represent the two joined contours. While the local variable progress continues to have the value true, as determined in step 2773, the do-while loop of steps 2766-2773 continues to iterate.

Figure 27G:
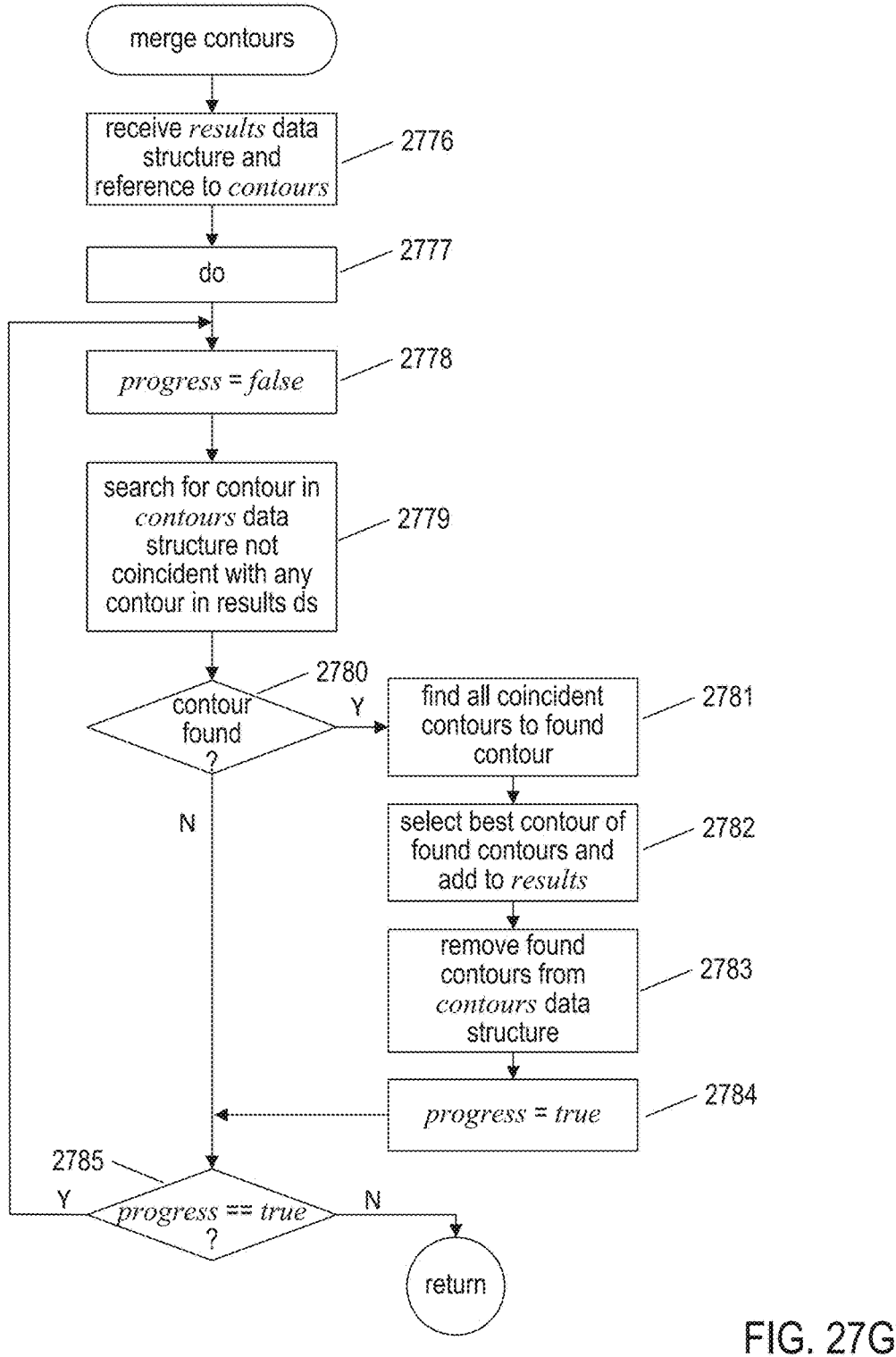
FIG. 27G illustrates, using control-flow diagrams and data-structure representations, one implementation of the currently disclosed method for finding contours in digital images, used in a variety of different devices, appliances, and computational systems as an initial step in various types of automated digital-image-based processes.

FIG. 27G provides a control-flow diagram for the routine "merge contours," called in step 2760 of FIG. 27E. In step 2776, the routine receives a reference to the results data structure and to the contours data structure. Then, in the do-while loop of steps 2777-2785, contours identified in compressed images are merged into the results data structure. In step 2778, the local variable progress is set to false. In step 2779, a next contour that is not coincident with any contour already in the results data structure is searched for among the contours identified in the compressed images and stored in the contours data structure. When such a contour is found, as determined in step 2780, then in step 2781, all contours coincident with the found contour in the identified contours of the compressed images are found. The best of these found contours is selected, in step 2782, and added to the results data structure. Various criteria, including length, may be used to select the best contour. Two contours may be considered coincident when they share more than a threshold number of pixels, when the share more than a threshold percentage of the total pixels in the contours, or by other considerations. The initially found contour and coincident contours are then removed from the contours data structure in step 2783. In step 2784, the local variable progress is set to true. The do-while loop iterates until the value of the local variable progress is false, in step 2785.

Although the present invention has been described in terms of particular embodiments, it is not intended that the invention be limited to these embodiments. Modifications within the spirit of the invention will be apparent to those skilled in the art. For example, any of many different design and implementation parameters, including modular organization, programming language, hardware platform, control structures, data structures, and other such design and implementation parameters, may be varied to provide a variety of different implementations of the disclosed methods and systems.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An image-processing subsystem comprising:
   one or more memories; and
   one or more processors, coupled to the one or more memories, to:
   receive a digital image,
   identify seed pixels within the digital image coincident with intensity edges, and
   for each of the seed pixels,
   construct an incipient contour line segment that includes the respective seed pixel, wherein to construct the incipient contour line segment that includes the respective seed pixel, the processor to:
   determine a contour direction for the incipient contour line segment;
   construct a first vector with a tail coincident with the seed pixel, an orientation direction equal to the determined contour direction, and a length equal to a value of a segment parameter; and
   include a segment with endpoints coincident with the tail and a head of the first vector as a first segment in a multi-segment contour,
   iteratively extend both ends of the incipient contour line segment along an intensity edge to generate an extended contour line segment, and
   store the extended contour line segment in the one or more memories.

2. The image-processing subsystem of claim 1 wherein to identify the seed pixels with the digital image coincident with the intensity edges, the processor to:
   employ multiple parameter values that control contour identification comprising:
   a segment length L;
   a maximum segment inclination $\alpha$;
   a number of histogram bins h;
   a minimum histogram-bin value B; and
   a contour radius Re.

3. The image-processing subsystem of claim 1 wherein to identify the seed pixels within the digital image coincident with intensity edges further comprises the processor to:
   compress the received digital image to produce one or more compressed digital images for which the difference, in pixels, between the height and width of each compressed digital image is less than a threshold number of pixels;
   smooth each compressed digital image;
   generate a gradient map for each smoothed, compressed digital image; and
   identify seed pixels using the generated gradient map.

4. The image-processing subsystem of claim 3 wherein to smooth each compressed digital image further comprises the processor to apply a smoothing operation to the compressed digital image, the smoothing operation selected from among:
   median filtering;
   convolution with a Gaussian kernel; and
   convolution with an averaging kernel.

5. The image-processing subsystem of claim 3 wherein to generate a gradient map for each smoothed, compressed digital image further comprises the processor to:

allocate a gradient map in memory;
for each pixel of the smoothed, compressed digital image,
for each of three color channels,
compute a gradient magnitude for the pixel;
select the color channel for which the computed gradient magnitude is greatest; and
place indications of the gradient magnitude and gradient orientation for the selected color channel into a corresponding cell or element of the gradient map.

6. The image-processing subsystem of claim 5 wherein to compute a gradient magnitude for the pixel further comprises the processor to:
convolve a $G_x$ kernel with a color channel of the smoothed, compressed digital image to generate a horizontal-gradient-component map;
convolve a $G_y$ kernel with the color channel of the smoothed, compressed digital image to generate a vertical-gradient-component map; and
compute the gradient magnitude as the square root of the sum of the value stored in the horizontal-gradient-component map for the pixel and the value stored in the vertical-gradient-component map for the pixel.

7. The image-processing subsystem of claim 5 wherein to place the gradient orientation for the selected color channel into a corresponding cell or element of the gradient map further comprises the processor to:
compute the gradient orientation by applying the atan 2 function to the value stored in the vertical-gradient-component map for the pixel and the value stored in the horizontal-gradient-component map for the pixel.

8. The image-processing subsystem of claim 3 wherein to identify seed pixels using the generated gradient map further comprises, the processor to:
convolve the gradient-magnitude values of the generated gradient map with a non-maximum-suppression kernel to generate an intermediate point map; and
apply a thresholding operator to the intermediate point map to generate a point map that contains seed pixels having the largest-valued gradient magnitudes.

9. The image-processing subsystem of claim 8 wherein to identify seed pixels using the generated gradient map further comprises, the processor to:
sort the identified seed pixels in descending order by gradient magnitude.

10. The image-processing subsystem of claim 1 wherein to determine a contour direction for the incipient contour line segment further comprises, the processor to:
for each of multiple candidate directions,
construct a first vector with a tail coincident with the seed pixel, an orientation direction equal to the candidate direction, and a length equal to the value of a segment parameter,
determine an average magnitude of the projections of the gradients of the pixels coincident with the first vector, and
determine a histogram of the gradients of the pixels coincident with the first vector;
select, as a final contour direction, the candidate direction for which average magnitude of the projections has a greatest value; and
when the final contour direction coincides with a detectable intensity edge in the received digital image, select, as the contour direction, the final contour direction.

11. The image-processing subsystem of claim 10 wherein the final contour direction coincides with a detectable intensity edge in the received digital image when the final contour direction is perpendicular to direction corresponding to a maximum-valued histogram bin or a histogram bin immediately adjacent to the maximum-valued histogram bin and when the average magnitude of the projections of the gradients of the pixels coincident with the first vector is greater than a threshold value.

12. The image-processing subsystem of claim 1 wherein to iteratively extend both ends of the incipient contour line segment along an intensity edge to generate the extended contour line segment further comprises, the processor to:
iteratively
for each end of the contour line segment,
when the end of the contour line segment is not terminated,
attempt to determine a direction of the intensity edge at the end of the contour line segment,
when a direction of the intensity edge is determined, construct a vector at the end of the contour line segment in the determined intensity-edge direction, and
otherwise terminate the end of the contour line segment,
until both ends of the contour line segment are terminated.

13. The image-processing subsystem of claim 12 wherein the direction of the intensity edge at the end of the contour line segment is constrained to be inclined by no more than an angle a to either side of a direction of the contour line segment at the end of the contour line segment.

14. The image-processing subsystem of claim 13 wherein the direction of the contour line segment at the end of the contour line segment is determined as:
a direction of the segment coincident with the end of the contour line segment; and
a direction determined by a least-squares approximation based on a final number of segments at the end of the contour line segment.

15. The image-processing subsystem of claim 1 further comprising, the processor to:
follow identification of contours in each smoothed and compressed image,
combine pairs of contours representing two portions of a common intensity edge separated by a gap of less than a threshold length; and
merge contours identified in multiple smoothed and compressed images.

16. A method comprising:
receiving, by a processor, a digital image, the processor coupled to one or more memories;
identifying, by the processor, seed pixels within the digital image coincident with intensity edges; and
for each of multiple seed pixels,
constructing, by the processor, an incipient contour line segment that includes the respective seed pixel, wherein constructing of the incipient contour line segment that includes the respective seed pixel further comprises:
determining a contour direction for the incipient contour line segment;
constructing a first vector with a tail coincident with the seed pixel, an orientation direction equal to the determined contour direction, and a length equal to a value of a segment parameter; and
including a segment with endpoints coincident with the tail and a head of a first vector as the first segment in a multi-segment contour, iteratively extending, by the processor, both ends of the incipient contour line segment along an intensity edge to generate an extended contour line segment, and storing, by the processor, the extended contour line segment in the one or more memories.

17. The method of claim 16 wherein identifying seed pixels within the digital image coincident with intensity edges further comprises:
compressing the received digital image to produce one or more compressed digital images for which the difference, in pixels, between the height and width of each compressed digital image is less than a threshold number of pixels;
smoothing each compressed digital image;
generating a gradient map for each smoothed, compressed digital image; and
identifying seed pixels using the generated gradient map.

18. The method of claim 17 wherein generating a gradient map for each smoothed, compressed digital image further comprises:
allocating a gradient map in memory;
for each pixel of the smoothed, compressed digital image, for each of three color channels,
computing a gradient magnitude for the pixel;
selecting the color channel for which the computed gradient magnitude is greatest; and
placing indications of the gradient magnitude and gradient orientation for the selected color channel into a corresponding cell or element of the gradient map.

19. The method of claim 17 wherein identifying seed pixels using the generated gradient map further comprises:
convolving the gradient-magnitude values of the generated gradient map with a non-maximum-suppression kernel to generate an intermediate point map; and
applying a thresholding operator to the intermediate point map to generate a point map that contains seed pixels having the largest-valued gradient magnitudes.

20. The method of claim 16 wherein determining a contour direction for the incipient contour line segment further comprises:

constructing a first vector with a tail coincident with the seed pixel, an orientation direction equal to the candidate direction, and a length equal to the value of a segment parameter,
determining an average magnitude of the projections of the gradients of the pixels coincident with the first vector, and
determining a histogram of the gradients of the pixels coincident with the first vector;
selecting, as a final contour direction, the candidate direction for which average magnitude of the projections has a greatest value; and
when the final contour direction coincides with a detectable intensity edge in the received digital image,
selecting, as the contour direction, the final contour direction.

21. Non-transitory computer-readable media having recorded thereon instructions, that when executed by one or more computer processors coupled to one or more memories, perform operations comprising:
receiving a digital image;
identifying seed pixels within the digital image coincident with intensity edges; and for each of the seed pixels,
constructing an incipient contour line segment that includes the respective seed pixel, wherein constructing of the incipient contour line segment that includes the respective seed pixel further comprises:
determining a contour direction for the incipient contour line segment;
constructing a first vector with a tail coincident with the seed pixel, an orientation direction equal to the determined contour direction, and a length equal to a value of a segment parameter; and
including a segment with endpoints coincident with the tail and a head of the first vector as a first segment in a multi-segment contour,
iteratively extending both ends of the incipient contour line segment along an intensity edge to generate an extended contour line segment, and
storing the extended contour line segment in the one or more memories.

* * * * *